(12) United States Patent
Kyllingstad

(10) Patent No.: US 8,265,811 B2
(45) Date of Patent: Sep. 11, 2012

(54) METHOD AND APPARATUS FOR ACTIVE HEAVE COMPENSATION

(75) Inventor: Aage Kyllingstad, Algard (NO)

(73) Assignee: Varco I/P, Inc., Houston, TX (US)

(*) Notice: Subject to any disclaimer, the term of this patent is extended or adjusted under 35 U.S.C. 154(b) by 388 days.

(21) Appl. No.: 12/517,398

(22) PCT Filed: Dec. 6, 2006

(86) PCT No.: PCT/GB2006/050430
§ 371 (c)(1),
(2), (4) Date: Jun. 3, 2009

(87) PCT Pub. No.: WO2008/068445
PCT Pub. Date: Jun. 12, 2008

(65) Prior Publication Data
US 2010/0057279 A1 Mar. 4, 2010

(51) Int. Cl.
*G05D 1/00* (2006.01)
(52) U.S. Cl. .......... 701/21; 701/1; 701/37; 701/534; 166/250.01; 166/355
(58) Field of Classification Search .......... None
See application file for complete search history.

(56) References Cited

U.S. PATENT DOCUMENTS

| | | | | |
|---|---|---|---|---|
| 4,104,608 A * | 8/1978 | Melling et al. | .......... | 367/12 |
| 5,130,926 A * | 7/1992 | Watanabe et al. | .......... | 701/37 |
| 5,209,302 A * | 5/1993 | Robichaux et al. | .......... | 166/355 |
| 5,894,895 A * | 4/1999 | Welsh | .......... | 175/5 |
| 6,082,947 A * | 7/2000 | Adamson | .......... | 414/137.7 |
| 6,201,763 B1 * | 3/2001 | Bourgeois et al. | .......... | 367/12 |
| 6,216,789 B1 * | 4/2001 | Lorsignol et al. | .......... | 166/355 |
| 6,382,022 B1 * | 5/2002 | Martinez et al. | .......... | 73/178 R |
| 6,836,707 B2 * | 12/2004 | Sowada et al. | .......... | 701/21 |
| 6,926,259 B1 * | 8/2005 | Roodenburg et al. | .......... | 254/277 |
| 7,281,585 B2 * | 10/2007 | Zheng | .......... | 166/355 |
| 7,798,471 B2 * | 9/2010 | Christopher | .......... | 254/277 |
| 2003/0225491 A1 * | 12/2003 | Sowada et al. | .......... | 701/21 |
| 2005/0077049 A1 * | 4/2005 | Moe et al. | .......... | 166/355 |
| 2005/0160959 A1 * | 7/2005 | Roodenburg et al. | .......... | 114/258 |
| 2007/0187108 A1 * | 8/2007 | Zheng | .......... | 166/354 |
| 2007/0250227 A1 * | 10/2007 | Fossen et al. | .......... | 701/21 |
| 2007/0272906 A1 * | 11/2007 | Davidson | .......... | 254/270 |

FOREIGN PATENT DOCUMENTS

| | | |
|---|---|---|
| EP | 0 261 731 A2 | 3/1988 |
| GB | 2 215 468 A | 9/1989 |
| WO | WO2005/005874 | 1/2005 |

* cited by examiner

*Primary Examiner* — Khoi Tran
*Assistant Examiner* — Jonathan L Sample
(74) *Attorney, Agent, or Firm* — Williams, Morgan & Amerson, P.C.

(57) ABSTRACT

Methods and apparatuses for active heave compensation, the method, in certain aspects, including the steps of: (a) measuring with a measurement device (44) the heave of a vessel (10) and outputting a heave signal representative thereof; (b) using said heave signal to compensate for said heave by moving a connection device (20) relative to said vessel (10) as a function of said heave signal, whereby movement due to said heave of a load attached to said vessel via the connection device is reduced; said heave signal comprising errors induced by said measurement device (44) whereby accuracy of said compensation is reduced; (c) processing said heave signal so as to reduce said errors and outputting an adjusted heave signal; and (d) using said adjusted heave signal to move said connection device (20) to compensate for said heave.

19 Claims, 23 Drawing Sheets

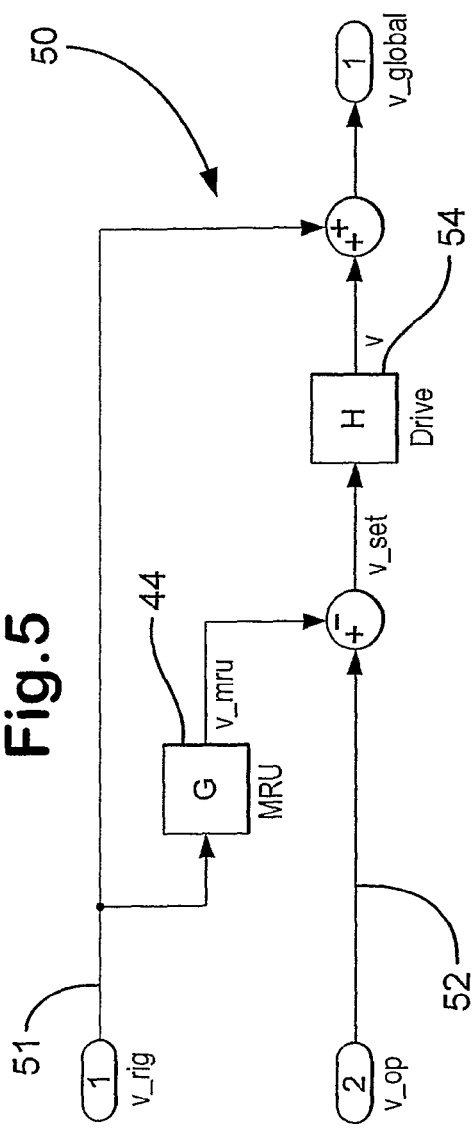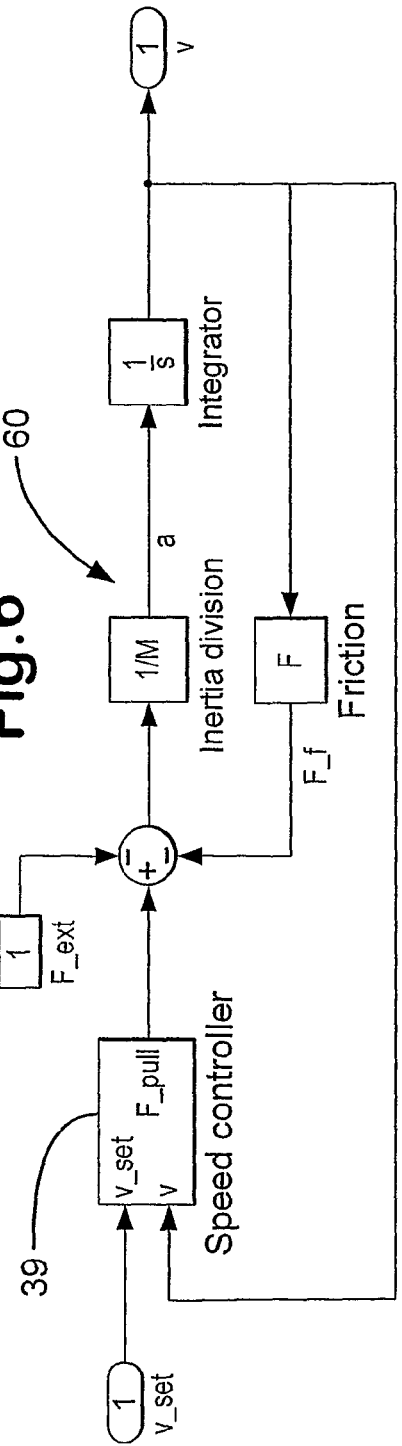

METHOD AND APPARATUS FOR ACTIVE HEAVE COMPENSATION

FIELD OF THE INVENTION

The present invention relates to methods and apparatus for actively compensating heave of a vessel, to a method of starting and stopping active heave compensation, to a measurement device for measuring heave of a vessel, to an apparatus for controlling the method, to a method of installing and configuring such apparatus, and to a computer program comprising computer executable instructions for performing the method.

BACKGROUND TO THE INVENTION

The operations of many floating vessels (e.g. semi-submersible drilling rigs, drill ships and pipe-laying ships) are impeded by sea swell. Sea waves impart an up and down motion to the vessel (known as 'heave'), the period of which can range from a few seconds to 25 s or so, and can be of a few centimeters to 15 m or more in amplitude. This up and down motion is imparted to a load attached to the vessel. In many circumstances the motion of the load is highly undesirable and even dangerous to equipment and personnel. For example when attempting to drill a wellbore in the sea bed, the motion can cause a corresponding motion of the drill string. The up and down movement of the drill bit is highly undesirable and severely restricts the operating window of the rig. For example, it is estimated that in the North Sea as much as 20% of rig operating time is lost 'waiting on weather' i.e. waiting for better weather when the sea is calmer.

Heave compensation is concerned with reducing the effect of this up and down motion on a load attached to the vessel. So-called 'passive' heave compensation methods are known which rely on the load being fixed at some other point (e.g. to the sea bed). Sea swell causes the vessel to move relative to the load and a passive compensator uses compressed air to provide a low frequency damping effect between the load and the vessel. There are several disadvantages with passive heave compensation methods and apparatus, including that the weight (typically 100-150 tons) of the passive compensator must be suspended tens of meters above the rig floor, which affects the centre of gravity of the vessel, and that the use of passive compensation is limited to loads that are attached to some other point.

So-called active heave compensation methods have been deployed in the field in recent years. An active heave compensation method involves measuring the movement of the vessel using a measuring device (for example a Motion Reference Unit or MRU) and using a signal representing the motion of the vessel to control a drive for moving the connection device (e.g. travelling block, crane hook) relative to the vessel. In principle, if the connection device is moved in a manner equal but opposite to the motion of the vessel the heave can be substantially cancelled. A major advantage of active heave compensation is that it does not rely on movement of the load itself relative to the vessel before compensation can be applied.

The drive controlling motion of the connection device may comprise an AC drawworks for example. A drawworks is a powerful (e.g. 6 MW) winch that is connected to the connection device by a cable that passes through a block and tackle arrangement. Reeling in and out of the cable causes the connection device to be raised and lowered relative to the vessel. An operator command (e.g. to raise or lower the load) is superimposed onto the heave compensation so that the desired motion of the load is achieved irrespective of the motion of the vessel.

However, it has been observed in the field that such active heave compensation has an error of about 10-20% of the heave amplitude. Thus for a heave amplitude of 1 m, the load can be out of position by about 0.1-0.2 m. Such an error is not acceptable, particularly if lowering a string of tubulars from the surface for connection to wellhead on the sea bed for example.

Another problem of active heave compensation is that as the amplitude of the motion of the vessel due to heave increases, the demands on the drive to achieve complete compensation increases accordingly. Sooner or later each parameter of the drive will reach its limitation: force limitations, power limitations, speed limitations, and/or acceleration limitations. In this situation it can be dangerous to keep the active heave compensation in operation since some part may fail and damage equipment and/or personnel; yet at the same time it is dangerous to switch off active heave compensation since the heave of the vessel may cause similar problems. The usual method for dealing with this problem has been to set a constant threshold for each of the parameters; if one of parameters exceeds the constant threshold active heave compensation is switched off. However, this does not really address the aforementioned problem.

A yet further problem of active heave compensation is caused in activating and de-activating the compensation. In particular, large torque fluctuations can result in the motors controlling the load when heave compensation is switched on or off.

SUMMARY OF THE INVENTION

A first aspect of the present invention is based on the discovery that there are errors introduced by the apparatus that performs active heave compensation, and that these errors can be substantially corrected whereby the accuracy of the heave compensation is greatly improved (in some cases the aforementioned error is reduced to approximately 1-2%). The errors can be broken down into three main areas:

(a) errors introduced by the vessel motion measurement device;

(b) errors introduced by the drive; and (c) errors introduced by friction in the apparatus responsible for moving the connection device.

Correcting or reducing the errors of any one, or any combination, of (a)-(c) can improve the accuracy of the active heave compensation.

One of the errors in (a) is a lead phase distortion of a heave signal output from the measurement device. In one aspect the heave signal is a signal representing velocity of the heave, whereby the measured velocity is some time in front of the real velocity of the vessel. Surprisingly it was discovered that without any corrections for (a) the heave compensation can actually become unstable. The instabilities caused the amplitude of motion of the vessel relative to a load stiffly coupled to a fixed point (e.g. the sea bed) to actually increase exponentially with time. The applicant has discovered that such observed instabilities are caused by a combination of the lead phase shift errors from the vessel motion measurement device, a high mechanical stiffness of the coupling load (e.g. a marine riser which is fixed to the sea bed) and a high vessel mobility (which is explained in greater detail below). The lead phase shift introduces a negative damping mechanism that feeds energy into the oscillator system comprising the vessel and its hydrodynamic stiffness (which is proportional to the water plane area). The instability problem is most severe for semi-submersible rigs because they have a low hydrodynamic damping and a correspondingly high mobility at their natural period (typically around 20 s). When the negative damping exceeds the natural hydrodynamic damping of the vessel, the instability will appear as a resonance rig oscillation with growing amplitude. Accordingly correction of (a) should be done carefully to ensure that the lead phase error at the natural heave period is substantially (and ideally completely) cancelled.

According to one aspect of the present invention there is provided a method of actively compensating heave of a vessel to which a load is attached, there being a connection device connecting said load to said vessel, which method comprises the steps of:

(a) measuring with a measurement device the heave of said vessel and outputting a heave signal representative thereof;

(b) using said heave signal to compensate for said heave by moving said connection device relative to said vessel as a function of said heave signal, whereby movement of said load due to said heave is reduced;

said heave signal comprising errors induced by said measurement device whereby accuracy of said compensation is reduced, characterised by the steps of:

(c) processing said heave signal so as to reduce said errors and outputting an adjusted heave signal; and (d) using said adjusted heave signal to move said connection device to compensate for said heave.

Further steps of the method are set out in claims to 2 to 53 to which attention is hereby directed.

Drive Correction

According to another aspect of the present invention there is provided a method of actively compensating heave of a vessel to which a load is attached, there being a connection device connecting said load to said vessel, which method comprises the steps of:

(a) measuring with a measurement device the heave of said vessel and outputting a heave signal representative thereof;

(b) using said heave signal to control a drive apparatus for moving said connection device relative to said vessel whereby movement of said load due to said heave is reduced;

said drive apparatus introducing errors in said movement of said connection device whereby accuracy of said compensation is reduced, characterised by the steps of:

(c) adjusting the said heave signal so as to reduce errors introduced by said drive apparatus in effecting movement of said connection device; and (d) using said adjusted heave signal to move said connection device to compensate for said heave.

Dynamic Friction Correction

According to yet another aspect of the present invention there is provided a method of actively compensating heave of a vessel to which a load is attached, there being a connection device connecting said load to said vessel, which method comprises the steps of:

(a) measuring with a measurement device the heave of said vessel and outputting a heave signal representative thereof;

(b) using said heave signal to control a drive apparatus for moving said connection device relative to said vessel whereby movement of said load due to said heave is reduced;

said drive apparatus introducing errors in said movement of said connection device whereby accuracy of said compensation is reduced, characterised by the steps of:

(c) adjusting the said heave signal to compensate for dynamic friction in said drive apparatus; and (d) using said adjusted heave signal to move said connection device to compensate for said heave.

Delay Correction

A method of actively compensating heave of a vessel to which a load is attached, there being a connection device connecting said load to said vessel, which method comprises the steps of:

(a) measuring with a measurement device the heave of said vessel and outputting a heave signal representative thereof;

(b) using said heave signal to control a drive apparatus for moving said connection device relative to said vessel whereby movement of said load due to said heave is reduced;

said drive apparatus introducing a time delay in said movement of said connection device whereby accuracy of said compensation is reduced, characterised by the steps of:

(c) adjusting the said heave signal so as to reduce errors introduced by said time delay; and (d) using said adjusted heave signal to move said connection device to compensate for said heave.

Soft Switch

According to another aspect of the present invention there is provided a method of starting or stopping active heave compensation on a vessel, which method comprises the steps of gradually increasing or decreasing over a predetermined time the amount of heave compensation applied following receipt of a signal to switch said active heave compensation on or off respectively.

Dynamic Limitation

According to yet another aspect of the present invention there is provided a method of actively compensating heave of a vessel to which a load is attached, there being a connection device connecting said load to said vessel, which method comprises the steps of:

(a) measuring with a measurement device the heave of said vessel and outputting a heave signal representative thereof;

(b) using said heave signal to compensate for said heave by moving said connection device relative to said vessel as a function of said heave signal, whereby movement of said load due to said heave is reduced; and (c) applying a dynamic limit to the magnitude of said compensation.

Measurement Device

According to another aspect of the present invention there is provided a measurement device for measuring heave of a vessel, which measurement device comprises a memory storing computer executable instructions for performing any of the heave signal adjustment steps as set out above or herein. The measurement device may be a Motion Reference Unit comprising sensor(s) for measuring motion (e.g. acceleration) of the vessel. The output from the or each sensor may be processed by the MRU and sent to an electronic controller of a drawworks for example.

According to another aspect of the present invention there is provided an apparatus for controlling active heave compensation, which apparatus comprises a memory storing computer executable instructions for performing the any of the method steps above. The apparatus may comprise a computing device, such as a PLC, for installation on a vessel to control the drive apparatus (e.g. drawworks) to implement the invention. The apparatus may further comprise one or more measurement device for, in use, measuring the motion of the vessel. According to another aspect of the invention there is also provided a method of installing on a vessel the aforesaid apparatus. This method may also comprise the step of configuring the apparatus for that particular vessel.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously mentioned problems and long felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

BRIEF DESCRIPTION OF THE FIGURES

A more particular description of embodiments of the invention briefly summarized above may be had by reference to the embodiments which are shown in the drawings which form a part of this specification. These drawings illustrate certain preferred embodiments and are not to be used to improperly limit the scope of the invention which may have other equally effective or legally equivalent embodiments. Accordingly for a better understanding of the present invention reference will now be made by way of example only to accompanying drawings, in which:

FIG. 5 is a schematic control diagram for controlling a drive apparatus to provide heave compensation;

FIG. 6 is a schematic control diagram of the drive apparatus of FIG. 5;

FIGS. 27-1 and 27-2 illustrate one example of an MRU configuration report.

DETAILED DESCRIPTION OF THE PREFERRED EMBODIMENTS

Figure 1:
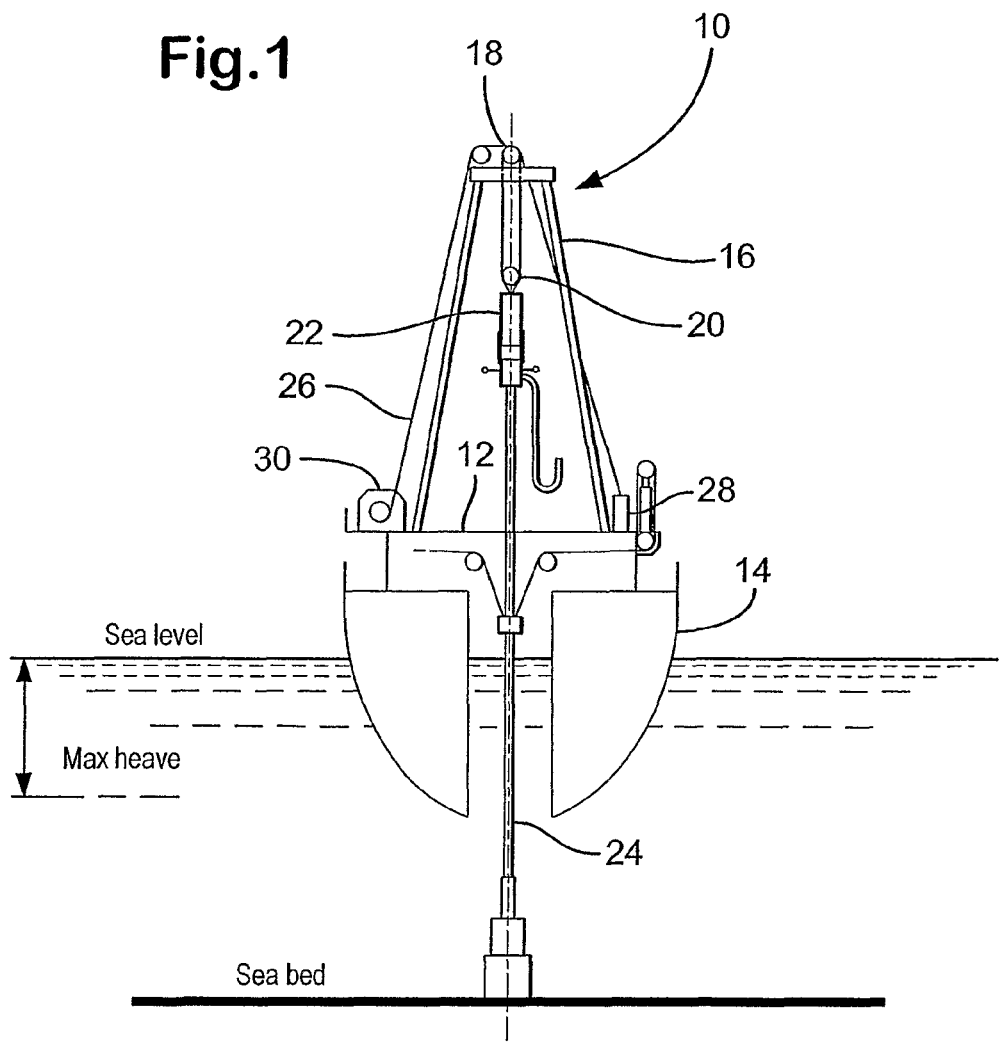
FIG. 1 is a schematic side view of a drill ship according to the present invention.

Referring to FIG. 1 a floating drilling rig generally identified by reference numeral 10 comprises a drill ship having a rig floor 12 supported on a hull 14. In this way the drilling rig floats at the surface with the rig floor supported some 15-30 m thereabove. The floating drilling rig 10 may be any type of vessel or floating rig, including a semi-submersible. The drill floor of a semi-submersible is supported on columns that in turn are supported by pontoons. The pontoons are flooded with sea water such that the pontoons are submerged to a predetermined depth below the surface of the sea.

The rig floor 12 supports a derrick 16 that comprises a crown block 18 (fixed relative to the derrick), and a travelling block 20 (moveable up and down the height of the derrick). A hook 22 is suspended from the travelling block 20 for picking up loads such as a drill string 24 via a top drive 25. The travelling block 20 and hook 22 perform the function of a connection device for connecting the load to the drill ship 10. Each of the crown block 18 and travelling block 20 comprise a number of sheaves (not shown) through which is threaded a steel rope 26 (sometimes known in the art as a drill line) of 25-50 mm diameter to provide a block and tackle type function. To one side of the derrick 16 the steel rope 26 is fixed to an anchor 28 on the rig floor 12, whereas to the other side of the derrick 16 the steel rope 26 is stored on a drum 29 (see FIG. 2) in a drawworks 30 located on the rig floor 12. The drawworks 30 has dimensions of about 9.22 m width by 3.91 m depth by 4.65 m high, weighs about 84,285 kg (84.3 metric tons), and can provide about 6 MW of power.

In use electrical motors 31 (see FIG. 2) in the drawworks 30 turn the drum 29 so as to reel the steel rope 26 in or out. Assuming that the drilling rig 10 is not in motion itself, reeling the steel rope 26 out results in lowering of the travelling block (and anything attached thereto) toward the rig floor 12, whereas reeling the steel rope 26 in results in raising of the travelling block 20 away from the rig floor 12. In this way the drawworks 30 can be used to move objects into and out of the wellbore, and to perform other functions. The electrical motors 31 may be of any type including AC motors, DC motors or permanent magnet motors for example.

Figure 2:
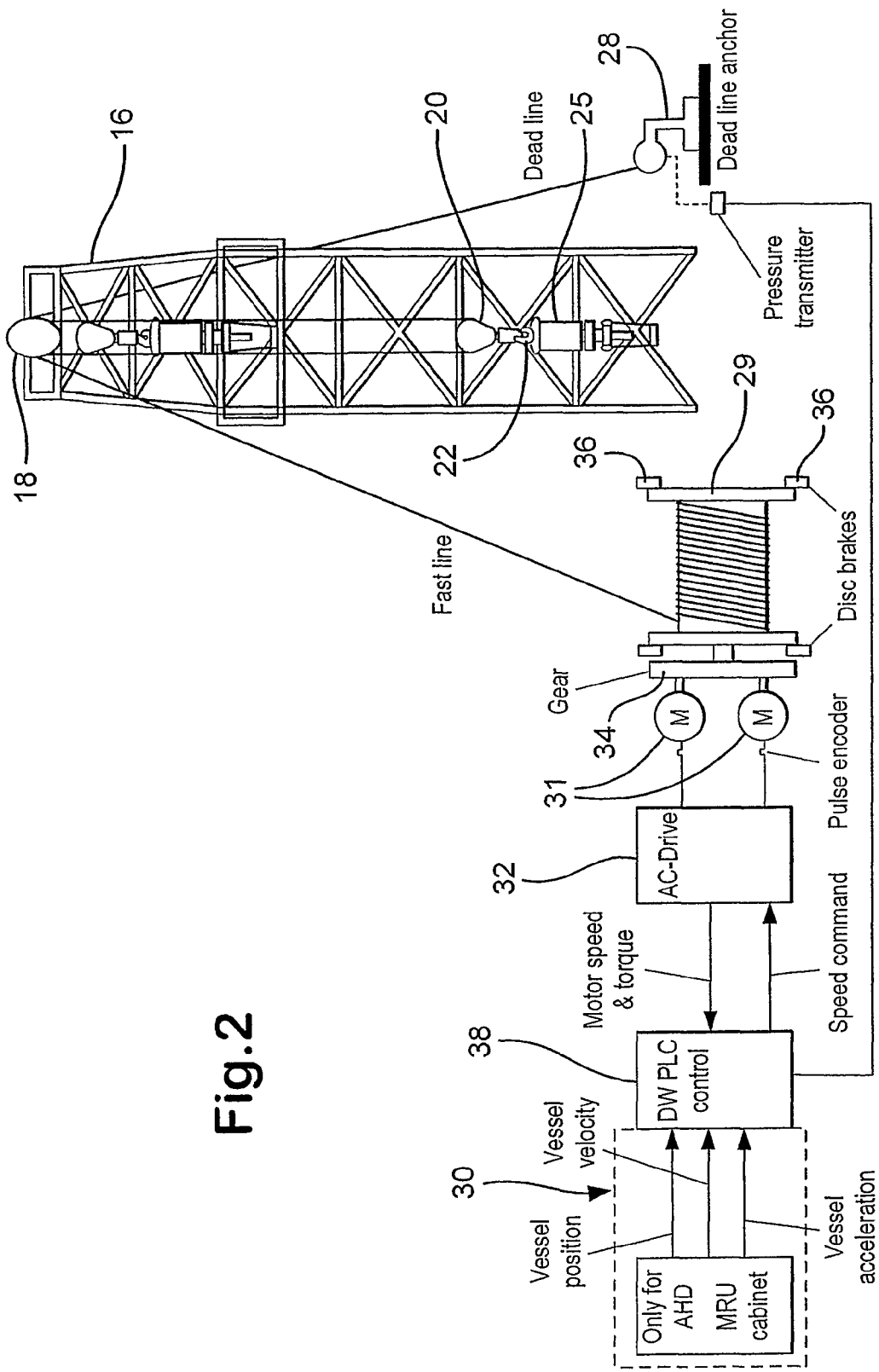
FIG. 2 is a schematic block diagram of a drawworks according to the present invention in use with the derrick of the drilling rig of FIG. 1.

Referring to FIG. 2 the drawworks 30 comprises an electric drive 32 controlling a number (e.g. four or six) electrical motors 31 for turning the drum 29 via a gear and pinion arrangement 34. All of the electrical motors 31 are permanently engaged with the drum 29, although the number that are in operation at any one time is controlled by the electric drive 32 according to speed and braking requirements. Hydraulic disc brakes 36 provide a "parking" function, emergency braking and load lowering in the event of a power cut.

Figure 3:
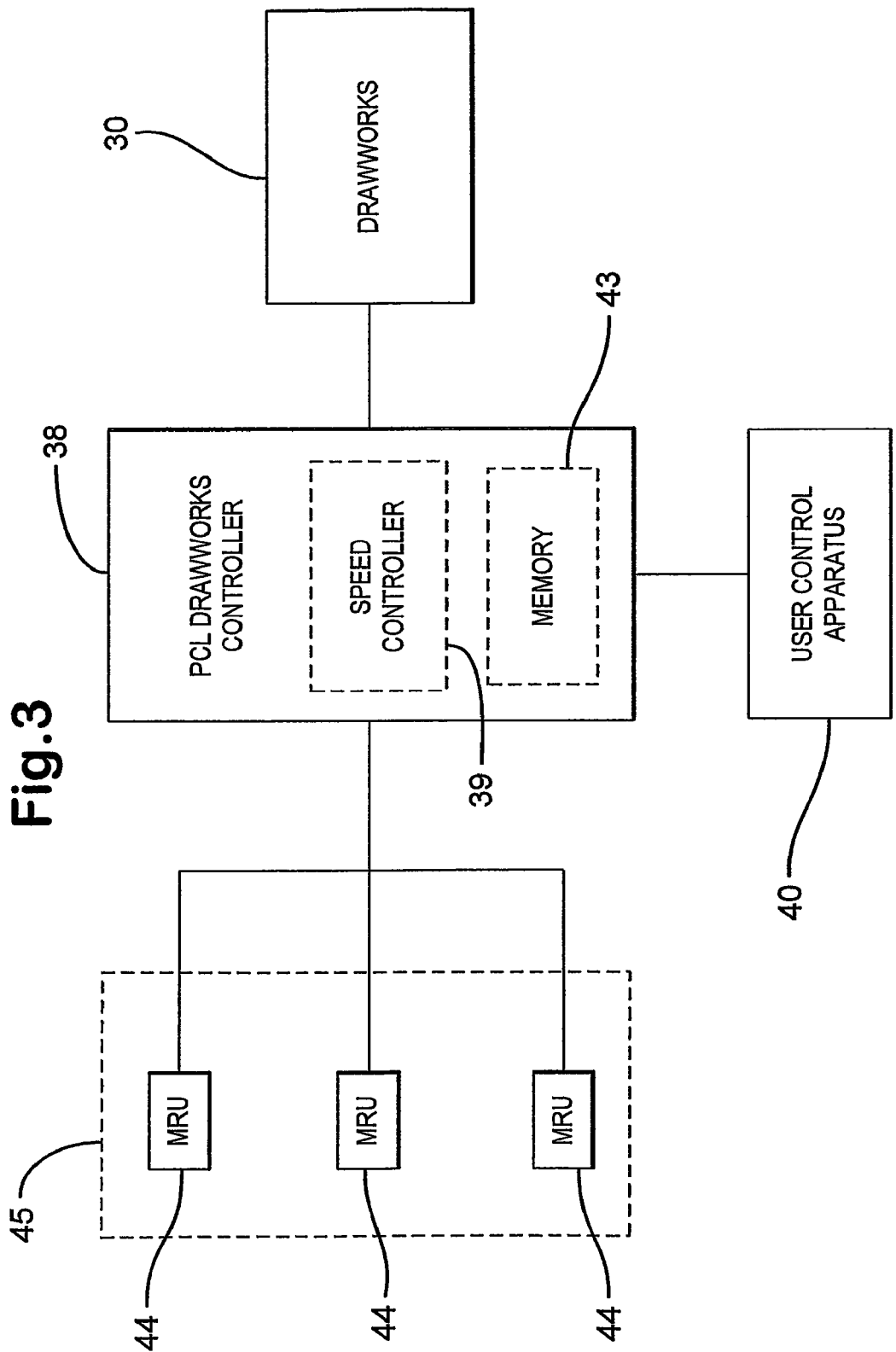
FIG. 3 is a schematic block diagram of the control apparatus of the drawworks in FIG. 2.

Referring also to FIG. 3 a drawworks controller 38 comprising a programmable logic controller (PLC) provides speed commands via a speed controller 39 to the electric drive 32 based inter alia on motor speed and torque data fed back to the controller 38 from a pulse encoder (not shown) on each electrical motor 31, and on inputs from a driller control apparatus 40. The driller control apparatus 40 may comprise a joystick (not shown) in a driller's cabin on the drilling rig 10; the driller's cabin comprises equipment for computer control of operations on the drilling rig 10. Movement of the joystick by the driller provides an output signal that causes the travelling block 22, via the drawworks 30, to raise or lower the load on the hook 22 at a speed (also controllable via the joystick).

The drawworks controller 38 also receives inputs from three Motion Reference Units (MRU) 44, each mounted in a cabinet 45. The output from each MRU 44 is input to the drawworks controller 38 that processes the signals to provide one output representing the heave acceleration, velocity and position of the drilling rig 10 as a result of ocean swell or heave.

Figure 4A:
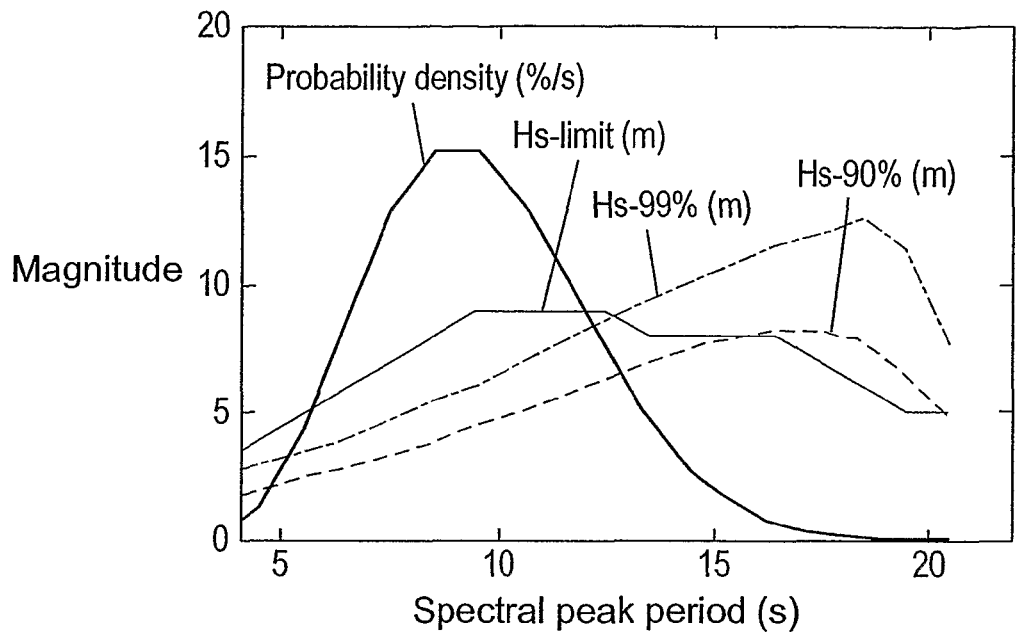
FIG. 4a is graph of the probability density of function and wave height as a function of wave period.
Figure 4B:
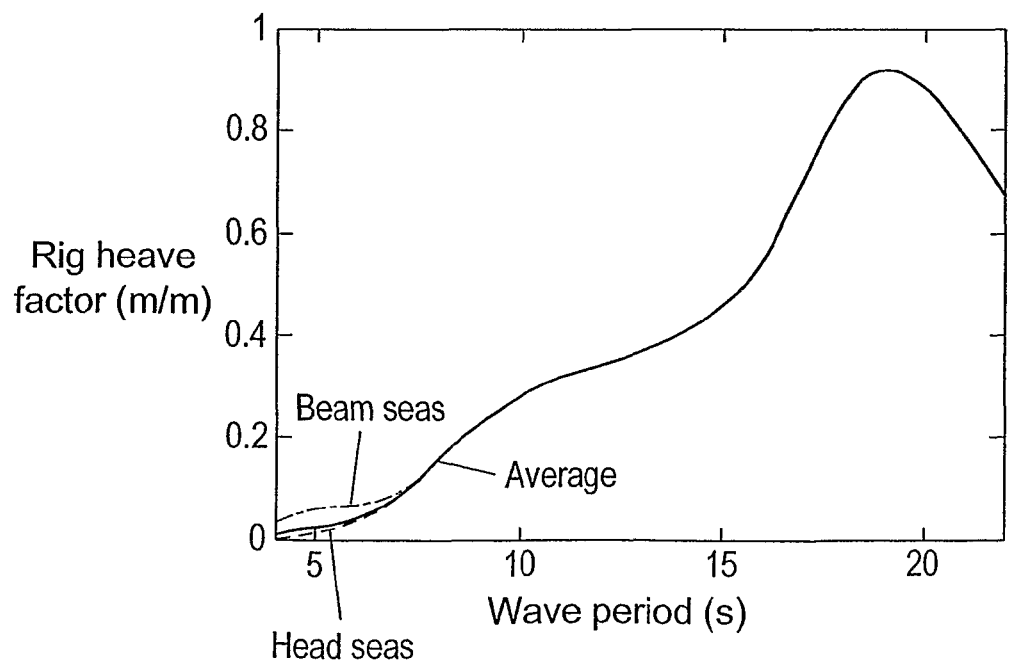
FIG. 4b is a graph showing rig response versus wave period.

The drilling rig 10 will oscillate in response to sea swell or waves with a complex motion comprising three translation modes (known as surge, sway and heave) and three angular modes (known as roll, pitch and yaw). Referring to FIG. 4a the typical range of frequencies of heave (i.e. vertical motion) is usually about 0.06 Hz to 0.2 Hz corresponding to a wave period of between about 16 s and 5 s respectively. The significant wave height (peak-to-peak) can vary from zero to several meters, even exceeding 10 m during severe storm conditions. The sea state can vary much from time to time, from season to season and from location to location around the world. FIG. 4b shows how a semi-submersible drilling rig responds to the different sea states. It will be noted that the relative rig heave response drops steeply as the period decreases from 18 s, and therefore the rig acts as an effective smoothing or low pass filter. As sea swell is a function of bad weather, many floating drilling vessels must wait on the weather. In the North Sea for example, waiting on weather can account for over 20% of the total time the rig is deployed.

In contrast to the angular motion, the magnitudes of the translation modes vary with position on the vessel. Often they are given for or measured at the centre of gravity of the vessel where they have minimum amplitudes, but they can also be measured in a location away from the centre of gravity. In many floating drilling rigs the well centre is not located at the centre of gravity, and it is the motion of the well centre that requires compensation. Because of the difficult access and moving parts near the well centre, devices for measuring heave of the vessel are often positioned some distance from the well centre. When the MRU is located off well centre, the effective heave at the well centre can be extrapolated from the MRU position by adding the heave components from roll and pitch motions. This extrapolation, which is called "lever arm" compensation, is normally performed by processing electronics inside the MRU but it can also be performed externally of the MRU in the control software (e.g. in the drawworks controller 38).

Measuring movement of the drilling rig 10 can be accomplished with a measurement device known as a Motion Reference Unit (MRU). An MRU is a device comprising linear motion sensors and gyroscopes for measuring rotational motion. The MRU used in this particular embodiment is an MRU-5 available from Kongsberg Maritime AS that measures and outputs inter alia signals representing roll, pitch, yaw and heave (any one or combination of which is herein called a 'heave signal'). The MRU-5 comprises three linear accelerometers and three Coriolis gyros for measuring linear accelerations and angular rates respectively about the three spatial axes. Other MRUs could be used however, such as the Tritech Intelligent Gyro Compass. It is also possible to construct a purpose built sensor that would measure heave acceleration, speed and acceleration only. Thus it is not essential to use an MRU-5 or similar. However, the additional sensors of such measurement devices do help improve accuracy, make for straightforward installation (the MRU-5 finds the vertical direction automatically even the MRU axis is not perfectly aligned to the vessel heave axis), and lever arm compensation.

The signals from the linear accelerometers are time integrated in the MRU to provide a velocity signal and then time integrated again in the MRU to provide a position signal. The signals from the gyros are used to make lever arm corrections if the MRU is placed some distance from the measurement point (MP). On a drilling rig it is normally desirable to measure the movement of the rig at the well centre since this most accurately reflects how the motion of the rig will affect the drill string 24 or other equipment attached to the rig 10. However, it is impractical to position the MRU at or near the well centre and therefore it is usually positioned some distance away. MRUs are usually configurable with: dimensions of the rig and its centre of gravity; X, Y and Z co-ordinates of the lever arms of the MRU and the measurement point; and with the mounting angles of the MRU in terms of roll, pitch and yaw. FIGS. 27-1 and 27-2 show an example of an MRU configuration report from which these configuration parameters can be seen under the headings of "VESSEL" and "SENSOR". By using these parameters and the signals from the gyroscopes the MRU can translate the outputs from the linear accelerometers into signals representing motion of the measurement point e.g. the well centre. However, it is possible to eliminate or reduce the need for lever arm compensation by using interpolation of two or more vertical accelerometers placed on different sides of the well centre or other point where the motion is desired to be measured.

Referring again to FIG. 3 three MRUs 44 are mounted in a cabinet 45 with the aforementioned MRU controller 42 that comprises a PLC with access to a memory 43 for processing the outputs from the MRUs 44 as described in more detail below.

Although advanced MRUs (such as the MRU-5 mentioned above) are able to extrapolate heave motion at the well centre from any vessel position, the relatively high noise from the gyro sensors and the lever arm compensations favours MRU locations as close to the well centre as possible in practice.

There are one hundred and eighty nine data output variables from each MRU-5. The final output signals used from the MRUs are as follows (first word is name presently given in MRU-5 manual):

(1) AccMruGY; acceleration of the rig at the measurement point in the vertical (y-axis), with positive acceleration in a downward sense;
(2) LA PosMonD; position of the rig at the measurement point, with distance increasing in a downward sense; and
(3) LA VelMonD; velocity of the rig at the measurement point, with positive velocity indicating a downward speed.

Referring to FIG. 5 a control diagram 50 shows how the signals from the MRUs 44 are used to provide active heave compensation when the rig moves with sea swell. Input signal 51 is the true rig vertical velocity $v_{rig}$ which is input to each MRU 44 (only one shown in FIG. 5). This is measured by the MRU 44 that provides an output which is the true velocity $v_{rig}$ multiplied by a linear but frequency dependent transfer function G. It is to be noted that as used herein $v_{mru}$ and $v_{rig}$ are defined positive upwards while the MRU-5 defines motion positive downwards. Input signal 52 is the desired operator velocity $v_{op}$ which is the speed that the driller wishes to move travelling block 20 (and attached load e.g. drill string 24) up or down the derrick 16. The output is subtracted in the drawworks controller 38 from the input $v_{op}$ to generate a set velocity $v_{set}$ of the travelling block 20. The set velocity $v_{set}$ may either be higher or lower than the desired operator velocity $v_{op}$ depending on whether the operator velocity $v_{op}$ is in the same direction as $v_{rig}$ at that point in time.

The set velocity $v_{set}$ signal is input to speed controller in the drawworks controller 38. The function of the speed controller 39 is to control the drawworks 30 to produce a travelling block motion that is close to the set velocity $v_{set}$. In applying the set velocity $v_{set}$ it necessary to rely on the entire electrical and mechanical systems of the drawworks 30, including the speed controller, motor power electronics, electrical motors 31, gears, drum 29 and steel rope 26, as well as the crown block 18 and travelling block 20. In FIG. 4 all of these items are referred to collectively as drive 54 which has a transfer function H. Ideally the transfer function H would be close to unity, but because of limitations in the speed controller 39 and mechanical inertia, the drive transfer function H often differs substantially from unity.

The output from the drive 54 is an actual travelling block velocity v measured relative to the derrick 16 by sensors (not shown). If both of the transfer functions G and H are unity, v would either be zero or $v_{op}$ independent of $v_{rig}$.

The true rig velocity $v_{rig}$ and the actual travelling block velocity v are summed to produce a global velocity $v_{global}$ which indicates the travelling block velocity in a fixed frame of reference, for example the sea bed. If the operator velocity $v_{op}$ is zero then the global velocity $v_{global}$ represents the compensation error $v_{err}$ in the actual travelling block velocity v introduced by the transfer functions G and H. From FIG. 4 it is possible to express $v_{err}$ as:

$$v_{err} = v_{rig} + Hv_{op} - HGv_{rig}$$

and therefore the relative compensation error E when $v_{op}$ is zero as:

$$E = \frac{v_{err}}{v_{rig}} = 1 - HG$$

The relative compensation error will only reduce to zero when the product GH is unity. Since neither the drive response H nor the MRU response G are perfectly equal to unity, there will always be a finite compensation error meaning that the vertical motion of the drilling rig 16 will not be completely cancelled by the movement of the travelling block 20.

It is possible to feedback a signal that is a function of the actual travelling block velocity v, position or hook load although in the applicant's experience this does not reduce the compensation error sufficiently. In particular, one problem with such feedback is that there is no simple way to measure the error or the global motion of the travelling block 20 accurately. If the string is fixed to bottom the variable hook load represents an indirect measurement of the global travelling block position. This can be used in a slow outer feedback loop, but will not help to improve short time compensation error significantly.

In tackling the problem of further reducing this compensation error the applicant realised that it is possible to compensate for the imperfect transfer functions of the MRU 53 and drive 54, despite the complexity of this problem. A brief summary of the applicant's analysis of the drive response and MRU response is given below.

Drive Response

Referring to FIG. 6 a control diagram 60 shows how the transfer function H of the drive 54 can be analysed. The speed controller 39 represents the electronic parts of the drive (motor speed regulator, axis conversions from the linear block axis to the angular motor axis, and the motor power electronics with current and torque controllers) and the other components represent the mechanical parts. As mentioned above the set velocity $v_{set}$ is input to the speed controller 39; the actual travelling block speed v is fed back to the speed controller 39. On the basis of these two inputs the speed controller 39 determines a pulling force $F_{pull}$ required to implement the set velocity $v_{set}$. Forces acting against $F_{pull}$ include friction forces $F_f$ (in all mechanical parts) and external forces $F_{ext}$ due to the inertia of all of the moving parts, but particularly the load on the hook 22, motor inertia, drum inertia, and inertia of the steel rope 26 and sheaves. Accordingly the summation circle represents the subtraction of $F_{ext}$ and $F_f$ from $F_{pull}$ yielding a resultant force applied to the load under the travelling block 20. By dividing the resultant force by the sum of inertial mass M of the motor, drum 29, steel rope 26, sheaves, travelling block 20 and load 24, the travelling block acceleration and speed v is set.

Before presenting the equation of motion in rotation axis coordinates it is worth mentioning that transformation from the motor axis to the linear load axis (and vice versa) is straightforward when using the transmission radius r $$r = \frac{r_{drum}}{n_{lines}n_{gear}}$$

Here $r_{drum}$ is the radius of drum 29, $n_{lines}$ is the number of lines and $n_{gear}$ is the motor to drum gear ratio (usually >>1). Linear load velocity v to angular motor speed $\Omega$ conversion is calculated by $v = r \cdot \Omega$, pull force F to motor torque conversion T by $T = r \cdot F$ and inertia mass M to moment of inertia $J_m$ conversion by $J = r^2 \cdot M$. The torque and inertia moment represent all synchronously running motors. The transmission radius is dynamic and changes in small steps when the steel rope 26 shifts from one drum layer to another.

The equation of motion for each electrical motor 31 of the drawworks 30 is:

$$J_m \frac{d\Omega}{dt} = T_m - T_{ext}$$

where $J_m$ is the effective moment of inertia of the motor (including gear, drum, lines, sheaves and load, $\Omega$ is the motor speed (in rad/s) and the $T_m$ and $T_{ext}$ denote motor torque and motor load respectively. The speed controller 39 is assumed to be a standard PI controller. The motor torque can be modelled as:

$$T_m = P(\Omega_{set} - \Omega) + \frac{P}{t_i} \int (\Omega_{set} - \Omega) dt$$

where P is the PI controller gain, $\Omega_{set}$ is the set point angular speed of the motor speed, and $t_i$ is the integral time of the PI controller. The Laplace transformed equation of motion is $$J_m \Omega s = P\left(1 + \frac{1}{t_i s}\right)(\Omega_{set} - \Omega)$$

By substituting a motor time constant $t_m = J_m/P$ the drive transfer function can be written as $$H = \frac{\Omega}{\Omega_{set}} = \frac{1 + t_i s}{1 + t_i s + t_m t_i s^2} = 1 - \frac{t_i^2 s^2}{1 + t_i s + t_m t_i s^2}$$

Recalling that E=1−GH, this expression for H implies that if the relative compensation error E is to be as small as possible, the integration time constant $t_i$ should be as low as possible, whereas the gain P of the PI controller should be as high as possible. In practice however, such speed control can lead to large torque fluctuations and even instabilities in the drawworks 30.

It is important for effective heave compensation correction that the drive constants $t_m$ and $t_i$ are determined accurately. The latter can either found directly from the drive configuration file or it can be found experimentally, for instance by locking the motors while sending a small step speed command $\Omega_{step}$ to the speed controller. According to the equation of motion above torque response will be a linearly increasing torque represented by $$T = P\Omega_{step} + \frac{P}{t_i} t$$

The integration time constant is the time after which the resultant torque has reached twice the initial step value, that is $T(t_i)=2P\Omega_{step}$ and the P-factor of the controller is simply the ratio of the torque step to the speed step: $P=T(0)/\Omega_{step}$. Finally, the controller or motor time constant can be found from $t_m=P/M$ where the denominator represents the total effective inertia mass of the travelling block 20 with line, sheaves, drum and motors. The mass is normally dynamic and varies with travelling block position and the amount of steel rope 26 reeled onto the drum 29. If one or more inertia terms are uncertain a test can be run to tune the inertia model. Such a test aims at measuring the ratio of motor torque to angular acceleration. This ratio is by definition equal to the effective motor inertia, which can be transformed to effective linear inertia, as explained above.

Figure 7:
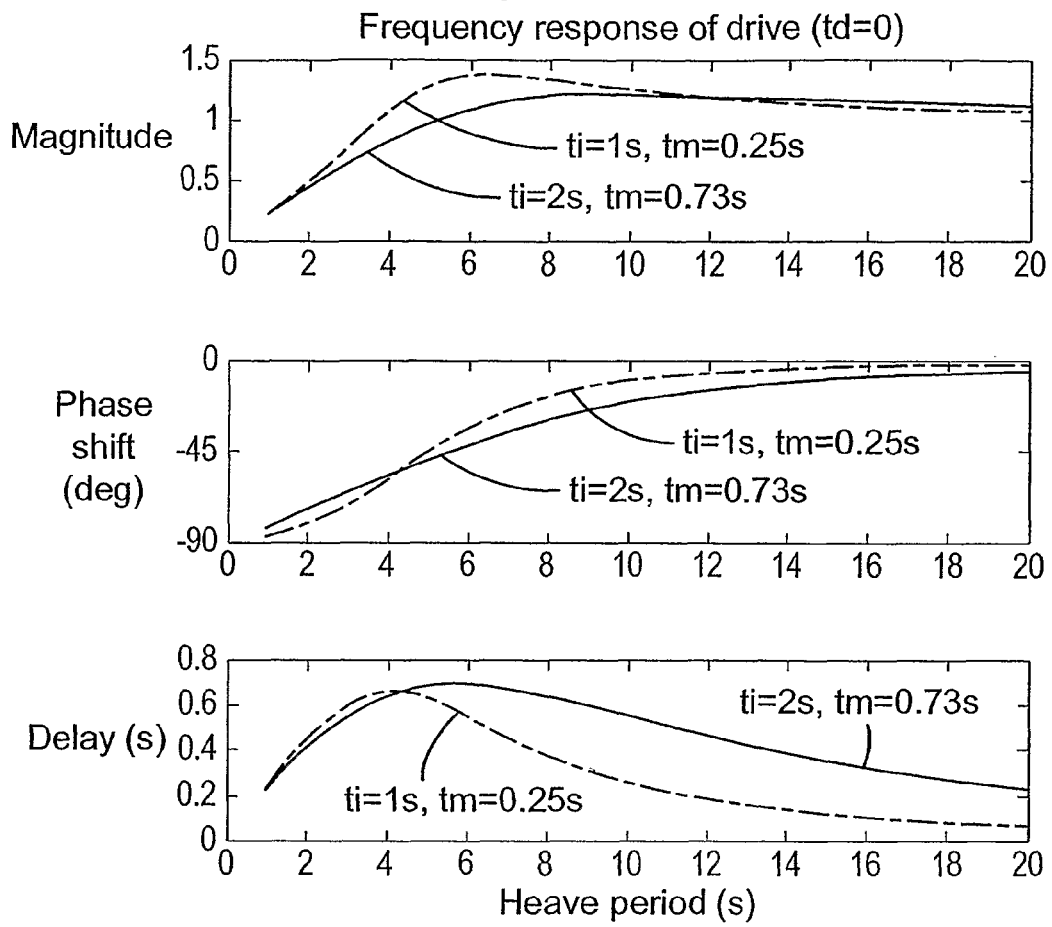
FIG. 7 is a set of graphs showing the frequency response of the drive apparatus of FIG. 6 for different heave periods.

FIG. 7 shows graphs of the effect of the transfer function H on the amplitude, phase and delay of the set velocity signal $v_{set}$ against heave (or wave) period. Two cases are illustrated: firstly when $t_i=2$ s and $t_m=0.73$ s, and secondly when $t_i=1$ s and $t_m=0.25$ s. The first case represents relatively "soft" speed control i.e. where the speed controller responds comparatively slowly to the relative compensation error E. The second case represents relatively "stiff" speed control i.e. where the speed controller responds comparatively quickly to the relative compensation error E. It will be seen in the first case that for the typical range of heave period i.e. between about 5 s and 16 s, soft speed control results in large delay and phase shift in $v_{set}$ at low heave periods. The stiff speed control results in a reduced delay and phase shift for longer heave periods, but at the expense of greater amplitude change and phase shift at shorter heave periods.

Figure 8:
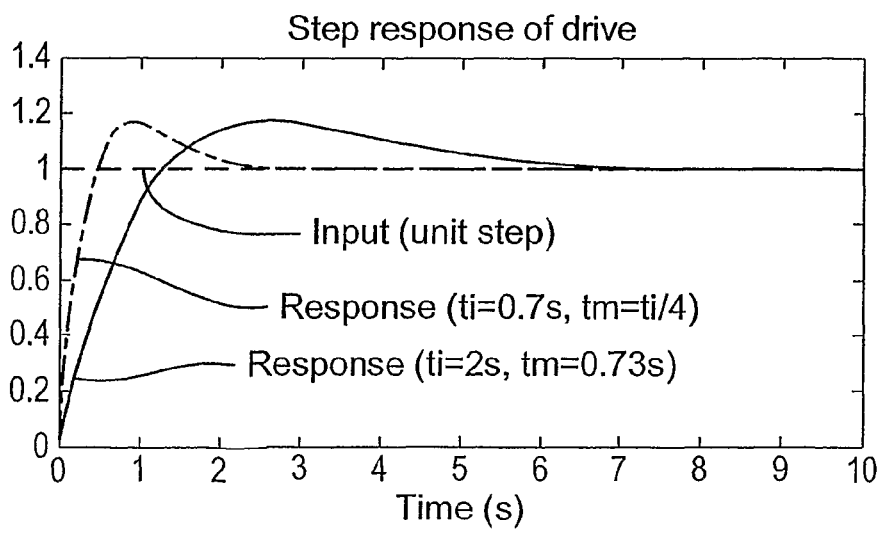
FIG. 8 is a graph showing the step response of the drive apparatus of FIG. 5.

FIG. 8 shows the response of the drive 54 to an input unit step function. In both cases of soft and stiff speed control, there is an overshoot 71 and 72 in the response function, although the stiffer speed control returns to the correct level nearly three times more quickly than the soft control.

Measurement Device Response

Figure 9:
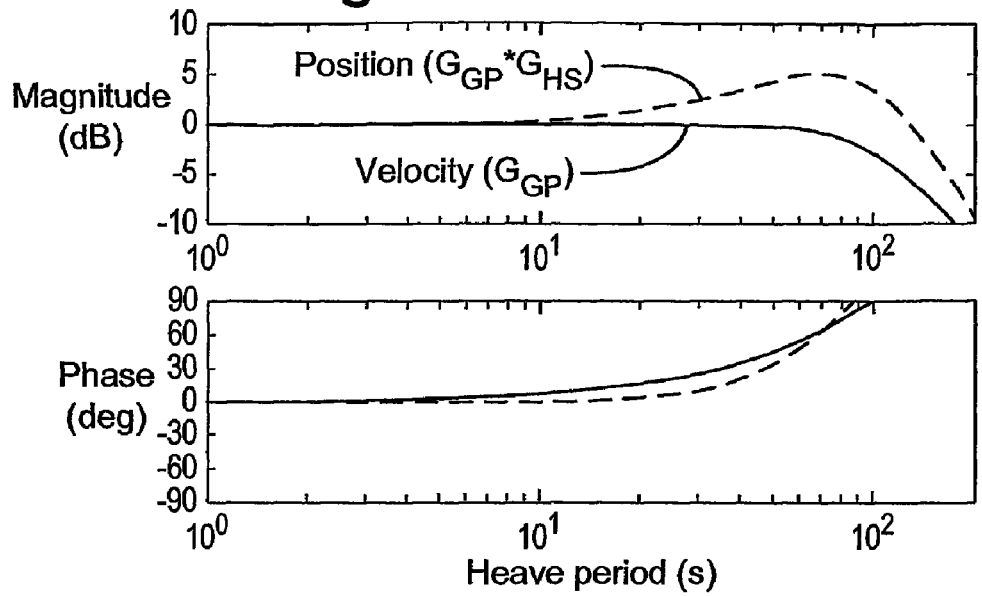
FIG. 9 is a graph of heave period versus phase and magnitude respectively for the velocity and position signals output from a measurement device.

As described above the MRU has between one and three accelerometers for measuring the vertical acceleration of the drilling rig 10. Optionally, angular gyros and magnetometers can be used to measure pitch, roll and yaw motion of the vessel. Electronics in each MRU subtracts the static acceleration of gravity, following which the dynamic vertical acceleration is integrated once and twice to obtain dynamic velocity and position respectively of the drilling rig 10. However, because of imperfections in the raw accelerometer signal, such as offset errors and low frequency noise, each integration step must be combined with a high pass filter for removing or damping the low frequency components. Accordingly a second order tuneable high pass filter is applied at each integration step. The MRU-5 supplied by Kongsberg-Seatex uses a standard second order Butterworth filter (called General Purpose (GP) filter) for the first integration step. For the second step (from velocity to position) there are two options: the GP filter and a so-called Hydrographic Survey (HS) filter. The Laplace representation of the two filters is:

$$G_{GP} = \frac{s^2}{s^2 + 2\varepsilon\omega_c s + \omega_c^2};$$

and $$G_{HS} = \frac{s^2 + 4\varepsilon\omega_c s}{s^2 + 2\varepsilon\omega_c s + \omega_c^2}$$

where $\omega_c=2\pi/(10T_h)$ represents the selectable cut-off frequency of the filter and $\varepsilon$ is the damping factor. The so-called heave period $T_h$ is a configuration parameter that can be selected and set by the user to between 2 s and 25 s. This is adjusted according to the dominant heave period either measured or expected for a particular rig in a particular location. Referring to FIG. 9 the transfer functions (magnitude and phase) for the velocity filter (G) and the combined position filter ($G_{GP}G_{HS}$) are shown versus the wave period ($T=2\pi i/s$, where $i=\sqrt{-1}$) for the case when $T_h=10$ s and $\epsilon=0.7$. From this figure it is seen that the GP filter has very small amplitude distortion but a significant lead phase shift for medium-long heave periods (one to three times the filter setting period). In contrast, the HS option of the position filter has a very small phase shift but a significant amplitude distortion in the same frequency band.

The main drawbacks of this lead phase error of the velocity signal are poor compensation accuracy and risk of instabilities. Instability means that the vessel starts to oscillate with growing amplitude at one of its natural frequencies. This phenomenon has been observed with a semi-submersible rig having the derrick and well centre between the aft rig legs, thus some distance from the centre of gravity. Growing oscillations have been observed both in the heave mode (natural period ~19 s) and in the pitch mode (natural period ~0.45 s). The applicant has discovered that the observed instabilities are caused by a combination of a significant lead phase error in the MRU velocity signal, high mechanical stiffness of the coupling load (e.g. a heavy fixed-to-bottom riser) and high vessel mobility. The lead phase error introduces a negative damping mechanism that feeds energy into the oscillator system comprising the vessel and its hydrodynamic stiffness. When the negative damping exceeds the natural hydrodynamic damping of the vessel, a small amplitude will start to grow exponentially. Semi-submersible rigs are more susceptible to this problem than drill ships because of the relatively small water plane area, the low hydrodynamic damping and the correspondingly high mobility at the natural periods. Pitch or roll instabilities can occur only on rigs having the well centre far away from the centre of gravity.

It is to be noted that the observed instabilities were substantially reduced when the lead phase errors were corrected as described below. Accordingly correction of errors introduced by the vessel motion measurement device should be done carefully to ensure that the lead phase error at the natural rig period is substantially (and ideally completely) cancelled.

In addition to the high-pass filters, the MRU-5 applies various types of low-pass filters for reducing high frequency noise in the signals (e.g. from vessel structure vibration, etc.). One of these filters is a tuneable vibration filter, which is a second order Butterworth low-pass filter. It is applied to the acceleration signals and to the angular gyroscope signals and the same kind of filter is applied to both. The upper cut-off frequency $f_{vib}$ is 3 Hz for the acceleration signal filter, while it is 10 Hz for the gyroscope signal filter. The vibration filter is not applied to the velocity signal, which is processed from the raw acceleration signal.

Independently of the vibration filter settings, the angular rate signals from the gyros are also by filtered by a moving average filter over a fixed window. This filter represents a delay time of typically 0.05 s and a correspondingly small lag phase distortion of the velocity components derived from the roll and pitch signals. Unless the MRU is placed far away from the well centre, these components are relatively small; consequently, the vibration filters will not have any practical influence on stability.

Error Function

Figure 10:
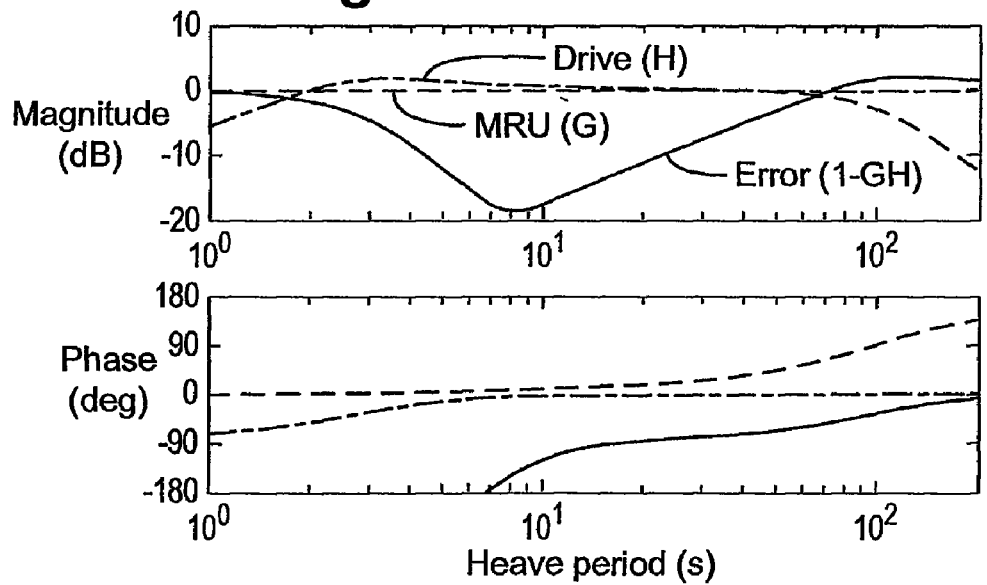
FIG. 10 is a graph of magnitude and phase versus heave period for the transfer functions of the measurement device, drive and error.

Knowing the two transfer functions H and G, it is possible evaluate the relative compensation error $E=1-HG$ as a function of heave period. Reference is made to FIG. 10 showing magnitude and phase versus heave period for all three functions. In this particular case the drive time constants are set as $t_i=0.5$ s and $t_m=0.25$ s (i.e. a relatively stiff speed controller), and $\epsilon=0.7$ and $T_h=10$ s for the MRU filter. The magnitude of the error function has a minimum of $-18$ dB at a period of 8 s and it increases as the period diverges from this value. Even at the minimum value, which corresponds to an error of 13%, the compensation is not particularly good. The correction methods described below will dramatically improve the compensation accuracy.

Corrected Heave Compensation

Figure 11:
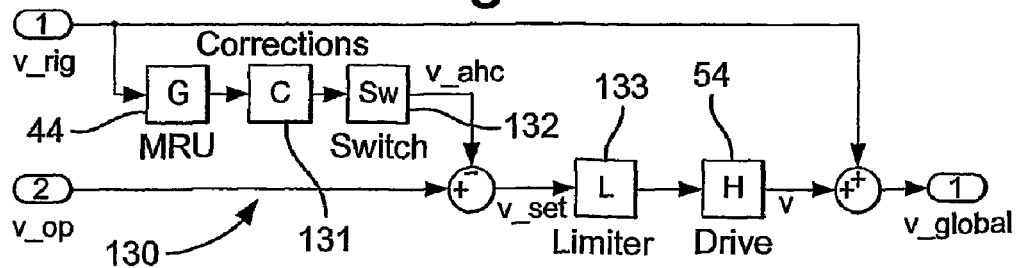
FIG. 11 is a control diagram of an active heave compensation method according to the present invention.

Referring to FIG. 11 a control diagram 130 shows how a correction transfer function C can be applied at correction block 131 to compensate for the errors introduced by the MRU 53 and drive 54. Applying the correction transfer function results in the relative compensation error becoming:

$$E = 1 - CGH$$

and therefore that E=0 when $$C = \frac{1}{G} \cdot \frac{1}{H}$$

Substituting the expressions for G and H derived above leads to a very complicated function that can be difficult to implement in practice. However, the function can be simplified as explained below.

MRU Filter Correction

Assuming that G is equal to the second order Butterworth high pass filter discussed above, the MRU correction filter can be approximated as:

$$\frac{1}{G_{GP}} = \frac{\omega_c^2 + 2\varepsilon\omega_c s + s^2}{s^2} \approx 1 + \frac{2\varepsilon\omega_c}{s}$$

This approximation is valid when $\omega_c \ll |s|$, that is when the actual heave period of the vessel is much lower than the filter cut-off period $2\pi/\omega_c$. Since the inverse Laplace variable $1/s$ represents integration from velocity to position in the time domain, the velocity correction term $v_G$ required to reduce the lead phase error of the MRU signal is:

$$v_G = 2\varepsilon\omega_c p_{mru}$$

where $p_{mru}$ is the position signal. The position signal to be used in this correction formula should preferably be the hydrographic survey signal estimated within the MRU-5, but it could also be calculated from the speed signal. In the latter case the time integration must be combined with a high pass filter.

Drive Correction

Regarding the transfer function for the drive 54 and making the assumptions above, its inverse can be written as:

$$\frac{1}{H} = \frac{1 + t_i s + t_m t_i s^2}{1 + t_i s} = 1 + t_m \frac{t_i s}{1 + t_i s} s$$

where the term, $t_i s/(1+t_i s)$ represents a first order high pass filter with time constant $t_i$ or, equivalently, with an angular cut-off frequency equal to $1/t_i$. Because the s factor represents differentiation in the time domain, the speed correction term $v_H$ needed to eliminate the effect of a non-perfect drive response is:

$$v_H = t_m F_{hp}\{a_{mru}\}$$

where $F_{hp}\{a_{mru}\}$ denotes the first order high-pass filtered value of the acceleration measured by the MRU. In contrast to the relative magnitude of $v_G$ which increases proportionally to the heave period ($T=2\pi/|s|$), the drive correction term $v_H$ decreases rapidly with increasing heave period. The latter is therefore most important for short heave periods (typically T<<10 s) when the inertia forces are high and the drive fails to follow the set speed accurately. The importance of the drive correction $v_H$, is also greater for soft speed controllers (having long time constant $t_i$) than for stiff ones.

Figure 12:
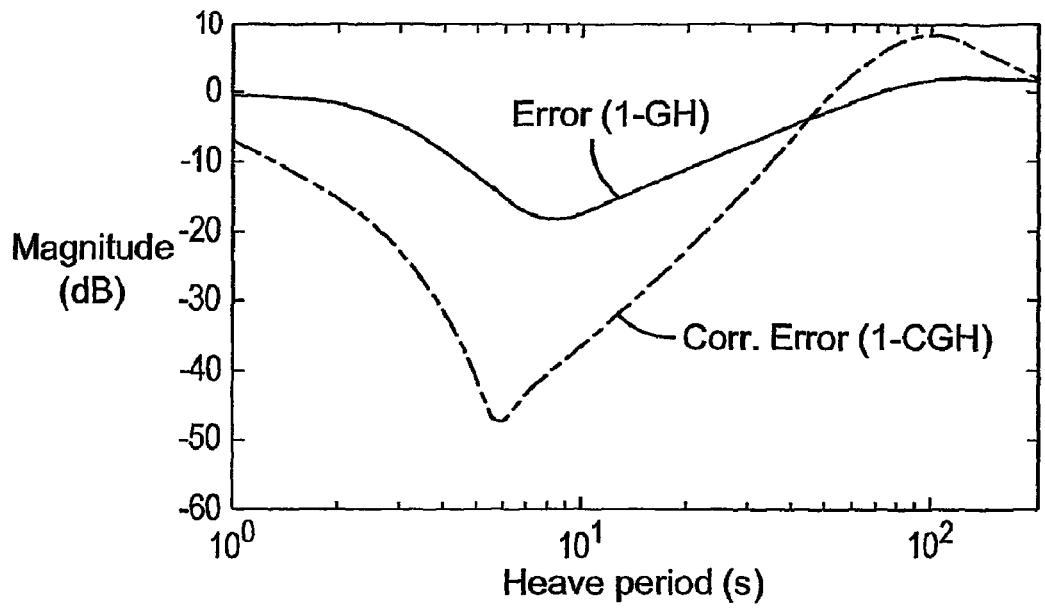
FIG. 12 is a graph of heave period versus magnitude of the error function showing with compensation according to the invention and without compensation.

The effect of applying both MRU and drive corrections is shown in FIG. 12. In this case the combined compensation function is approximately $$C \approx 1 + \frac{2\varepsilon\omega_c G_p}{s} + t_m \frac{t_i s}{1+t_i s} H_{vib} s$$

This formula represents an approximation of the ideal correction function, because both the second order MRU correction term and the cross terms arising when multiplying out the product of 1/G and 1/H have been neglected. However, the omitted terms are much smaller than the leading correction terms and can therefore be neglected. The MRU position filter function $G_P=G_{GP}G_{HS}$ and the vibration filter $H_{vib}$ (with 3 Hz cut-off frequency) are included in the respective correction terms to account for the fact that MRU position and acceleration signal are filtered versions of the true variables. As already mentioned, the MRU-5 acceleration signal is a low pass filtered version of the raw acceleration. $H_{vib}$ here represents a $2^{nd}$ order Butterworth filter with damping $\epsilon=0.7$ and a selectable cut-off frequency. An explicit expression for the transfer function of this vibration filter is $H_{vib}=1/(1+1.4 s/(2\pi f_{vib})+s^2/(2\pi f_{vib})^2)$ where the cut-off vibration frequency $f_{vib}=3$ Hz. The same parameters as used above are used in this example. It is to be noted that the error function is very much reduced over a wide range of wave periods, meaning that the proposed compensation methods have excellent potential for improving heave compensation accuracy.

Friction

So far friction has been neglected. In practice there are substantial friction losses, especially in the gear and in the sheaves. This friction is not purely linear and it can therefore not be accurately represented as an extra term in the drive response function.

A fairly simple but general model for the total friction force $F_f$ consists of a Coulomb friction term (that is constant but changes sign on change in direction of travelling block 20) and a linear term being proportional to the travelling block speed. The mathematical formulation for such a friction model is:

$$F_f = (1-\eta^{sign(v)})F_{hl} - d \cdot v$$

where $\eta$ is the total efficiency including losses in gear transmission and in the reeving system (sheaves), $F_{hl}$ is the hook load force and d is a damping coefficient (with a default value of zero) and sign(v) is the signum function (1 for positive arguments, 0 if the argument is zero and −1 for negative arguments). These friction parameters can be determined theoretically or experimentally from dedicated tests (see below).

By substituting friction acceleration $a_f=F_f/M$, where M is the total mass of the parts producing the friction force, the friction correction speed $v_F$ for reducing errors due to friction is:

$$v_F = -t_m F_{hp}\{a_f\}$$

where $F_{hp}\{a_f\}$ is a first order high-pass filter with filter time constant equal to the speed controller integration time constant $t_i$ in order to produce a motor pull force matching the extra load from friction losses.

As mentioned above the drawworks efficiency $\eta$ can be determined experimentally by hoisting and lowering a hook load and measuring the corresponding motor torque values. The efficiency can then be found from $$\eta = \sqrt{\frac{T_{m\downarrow}}{T_{m\uparrow}}}$$

where $T_{m\downarrow}$ and $T_{m\uparrow}$ represent the motor torque measured during slack-off and hoisting, respectively.

The expected value for the drawworks efficiency depends on the number of lines 26 and also on the line to sheave diameter ratio. A typical value with 14 lines is $\eta=0.89$ (from a single sheave efficiency of 0.99 and a gear efficiency of 0.97). However, the measured efficiency tends to be lower at low hook loads because some of the friction losses are constant and independent of load. Therefore, the test should be carried out with some weight in the hook, typically about 100 tons.

Alternatively the drawworks efficiency can be calculated theoretically from gear efficiency $\eta_{gear}$, single sheave efficiency $\eta_s$ and the number of lines n, by $$\eta = \eta_{gear} \frac{\eta_s^2(\eta_s^n - 1)}{(\eta_s - 1)n}$$

This efficiency is relatively insensitive to the number of lines, meaning that the error by using the same drawworks efficiency for twelve and fourteen lines is roughly 1%, and therefore not a great concern.

The drive and friction corrections presented above represent an indirect method where the set value for the speed controller 39 is adjusted to compensate for the expected motion these forces ($M_a+F_f$) will impose on the travelling block 20. An alternative method is to calculate the equivalent motor torque components of the forces and add these components directly to the normal output (torque) of the speed controller 39. However, this feed-forward method is only possible for speed controllers prepared for this kind of additional torque control (which are commercially available). The advantage of this feed-forward is that it does not rely on accurate estimation of the drive constants. The main disadvantage is complexity through sending an extra signal to the speed controller.

Delay

Although the delay $\tau$ had been assumed to be zero for the purposes of the drive and MRU corrections, experimentation by the applicant has revealed that there is a significant time delay (~0.1 s) in drive response due to signal transfer time delay rather than from softness of the speed controller 39. To correct for this delay a delay velocity correction $v_{delay}$ should be added to the MRU signal, determined as follows $$v_{delay} = t_{delay} HP(a_{rig})$$

where $t_{delay}$ is the transfer time delay of signals in the drive (default value is 0.1 s) and $HP\{a_{rig}\}$ is a first order high pass filter. The high pass filter has two functions: firstly it removes any residual DC component in the acceleration signal, and secondly it creates a desirable phase shift that substantially removes the phase lag from the MRU vibration filter. As mentioned above the vibration filter is a second order low pass Butterworth filter with a damping factor of $\epsilon=0.7$. Therefore the optimal time constant for the high pass filter is:

$$t_{hp,delay} = \frac{T_h^2 f_{vib}}{1.4.2\pi}$$

where $T_c$ is the most dominant rig heave period in the deployment location of the vessel 10 (a typical value is $T_h=10$ s).

In summary, the correction block 131 adjusts the original MRU speed signal $v_{mru}$ to generate a corrected version $v_{mruCorr}$ as follows:

$$v_{mruCorr}=v_{mru}v_G v_H v_F v_{delay}$$

The corrected velocity $v_{mruCorr}$ is then integrated in the MRU controller 42 to output a motion control signal for the travelling block 20 that substantially compensates for the actual vessel heave and makes the true global travelling block position follow the speed command from the operator more closely.

Position Correction

When the corrected MRU velocity signal (plus optional corrections) is integrated numerically in the MRU controller 42, the resulting position signal $p_{corr}$ can be subtracted from the raw position signal $p_{mru}$ from the MRUs 44 in a feedback loop. Experience has shown that this difference will generally not go to zero but drift slowly or approach an arbitrary position. It is believed that this is caused by rounding errors and finite computing accuracies, both in the MRU and in the PLC. This means that when the drilling rig 10 returns to a previous position, the travelling block 20 may not be in the same position on the derrick 16 as it was when the rig was at that position previously. To avoid this problem, the raw velocity signal from the MRUs 44 can be corrected by a position velocity correction signal $v_{pos}$ which is the low pass filtered value of the difference between the velocity of the rig determined from the position signal, i.e. $\dot{p}_{mru}$ and the corrected velocity $v_{mruCorr}$ as determined above, i.e.

$$v_{pos}=LP(\dot{p}_{mru}-v_{mruCorr})$$

Here the low pass filter is very slow with a time constant of several minutes, because $$\int(v_{mruCorr}+v_{pos})dt \approx LP(p_{mru})$$

This correction will inhibit drift and cause the position of the travelling block 20 to oscillate around the mean value of the MRU position. It is recommended to use the output "LAPosMonD" (i.e. the lever arm corrected position signal in the vertical axis) for the rig position signal, because this contains that static component of roll and pitch.

The position correction velocity $v_{pos}$ is added to $v_{mruCorr}$, although it is important that this correction is applied after all the preceding corrections as the drift problem can arise from the correction terms themselves.

Switch Module

Referring again to FIG. 11 a software switch 132 is used to switch heave compensation on and off, preferably in a smooth fashion to avoid abrupt transient motions. The applicant has tried a method of multiplying the MRU speed signal by a factor varying linearly from zero to unity (fade-in) or vice versa (fade-out). The drawback with this method is that the mean position of the travelling block 20 on the derrick 16 will not remain constant but be shifted by an amount depending on the start time (relative to the maximum heave position of the vessel) and on fade-in time interval. This is undesirable as is can result in a translation of the entire drill string 24 for example.

The aim is to fade-in or fade-out the heave compensation so that the travelling block position $h_{ahc}$ follows the MRU heave position signal in a gradually increasing amount, that is $$h_{ahc}=S \cdot p_{mru}$$

where S is a time dependent soft switch function varying between zero (no compensation) to unity (full compensation), and $p_{mru}$ is the position signal output from the MRU. The general active heave compensation signal to be added to the operator speed during fade-in and fade-out is, in terms of velocity $$v_{ahc}=S \cdot \dot{p}_{mru}+\dot{S} \cdot p_{mru} \approx S \cdot v_{mruCorr}+\dot{S} \cdot p_{mru}$$

where $\dot{S}$ denotes the time derivative of S. One advantage of providing a velocity correction in this way is that there will be substantially no translation of the travelling block 20 away from its mean position during fade-in and fade-out. One example of a suitable soft switch function is $$S=\frac{1-\cos(\pi x)}{2}$$

where x is a linearly varying coupling parameter limited between zero and unity. Explicitly, $$x=\max(0,\min(\int(\sigma/t_{fade})dt,1))$$

where $t_{fade}$ is the fade-in and fade-out time and $\sigma=1$ for fade-in and $\sigma=-1$ for fade-out. This soft switch function has the following features: 1) it varies continuously, 2) its time derivative also varies continuously without steps and 3) the time derivative vanishes at the end points, that is when x approaches zero or unity.

There are many soft switch functions satisfying the above features. Another example is $S=\frac{1}{2}+(2x-1) \cdot (1-|x-\frac{1}{2}|)$ where x is as defined above. Such soft-switch functions are valid not only during fade-in and fade out, but also whilst the active heave compensation is fully on or off. Therefore the function can be applied continuously.

Limiting Module

Referring to FIG. 11 a limiting module 133 follows the subtraction of the active heave compensation signal $v_{ahc}$ from the operator set velocity $v_{op}$. As the motion of the drilling rig 10 due to heave increases, the demands on the drive 54 to achieve complete compensation increases accordingly. Sooner or later the drive 54 will reach one of its limitations: force, power, speed, and/or acceleration.

The most common force limitation is brake margin limitation. Brake margin is defined as the difference between maximum motor pull force and external load. If this margin becomes too small the drawworks 30 cannot stop a downwards motion within the maximum allowable stopping distance (e.g. 3 m), for example when lowering a load toward the seabed, or lowering a drill string into a well bore. For safety reasons, it is therefore important to limit the downwards speed to safe level.

Electrical power limitations, be it in the drive 54 or externally in the drilling rig generators or grid system, also causes limitations in the mechanical power available i.e. the product of force and velocity. Power limitations can be positive or negative. The latter, which denotes limitations in the generative power flowing from the electrical motors 31 back to the drive controller, affects safety because it causes the brake margin to drop quickly with increasing downwards speeds. Power limitations can therefore be regarded as a dynamic speed or force limitation because the force limit drops with increasing speed. If the downward velocity exceeds the critical value at which motor pull capacity balances the external load (zero brake margin) the power limitation will make the brake margin negative and cause an unstable, free fall situation, which is extremely dangerous.

The speed limitation means that the travelling block speed cannot exceed speed limits defined by the rated motor speed (typically 2300 rpm for electrical motors) or other external speed limitations, such as drum speed limitation or load velocity limitation. For example, if the load is a drill string in an open well, too high a string speed can cause dynamic pressures that can cause damage to the well bore.

Both mechanical force and electrical power limitations indirectly limit the maximum or minimum acceleration of the drive 54. In addition, slack in steel rope 26 can impose a negative acceleration limit (i.e. downwards acceleration or deceleration of upward motion) which can cause the line near the drum 29 to lose tension resulting in tangling of the spooled line. This phenomenon, which is often called "bird nesting", must be avoided because it can block further spooling and cause serious damage to the drill string 24. The line slack acceleration limit is proportional to the external hook load and can be expressed by $a_{slack}=-F_{ext}/M_{sl}$ where $M_{sl}$ represents the inertia mass of the lines and sheave. It can either be calculated theoretically or (more easily) experimentally as the ratio $-F_{ext}/a_{slack}$ for which the fast line almost looses tension. The theoretical inertia mass can be found from the energy equation $$0.5 M_{sl} v^2 = \sum_j 0.5 J_i \Omega_i^2 + \sum_j 0.5 m l_j v_j^2$$

where $J_i$, $\Omega_i$ and $0.5 J_i \Omega_i^2$ are respectively inertia moment, angular speed and rotation energy of the ith sheave; and m, $l_j$, $v_j$ and $0.5 m l_j v_j^2$ represent mass per unit length, length, speed and translation energy of the jth segment of the drill line 26, respectively. The entire effective inertia mass M can then be found by adding also the rotational energy for the drum and motors and using the transmission radius defined above: $M=M_{sl}+(J_{motors}+J_{drum}/n_{gear}^2)/r^2$.

These acceleration limits impose restrictions in two ways. Firstly, they limit the speed indirectly so that the load or travelling block 20 can stop safely within constant or dynamic position limits Secondly, they place limits on the speed increments of the signal sent to the drive controller.

The torque, power and acceleration limitations above can be treated as a common speed limitation ensuring that the stop length does not exceed the available or specified maximum value. Because the motor pull force varies with speed, it is not possible to give explicit expression for this speed limit Instead, the limits (both negative and positive can be calculated as described in the algorithm described in appendix D. For simplicity, the algorithm is written for the case when the block/load is moving downwards. A similar but slightly different algorithm applies when the block is hoisted; the main differences are that 1) the speed is stepped in positive direction to find the stopping length upwards and 2) the external load acts in the opposite direction to the block motion. SI units are assumed for all variables in the algorithm.

Figure 12A:
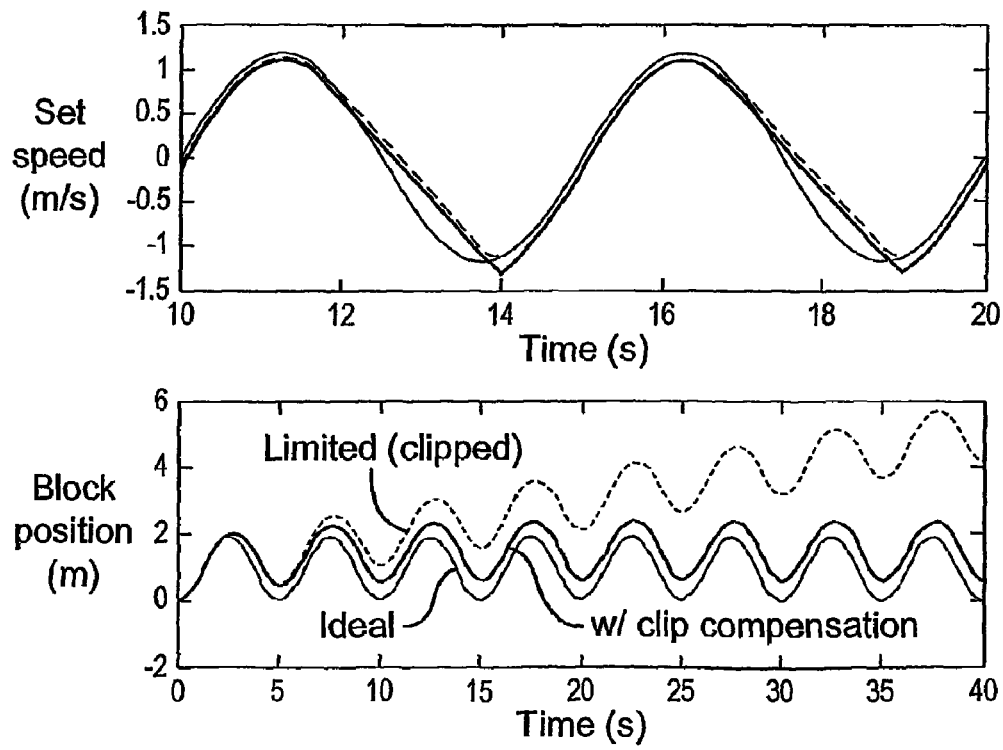
FIG. 12a is a graph of set speed and block position versus time showing how clipping of the set speed results in a gradual translation of the travelling block.

It is important to apply the limiting module 133 after summation of the operator and active heave compensation speeds, because it is the resulting set speed $v_{set}$ that must be limited to avoid the aforementioned hazardous situations. When the limiting module 133 is active, the speed signal $v_{set}$ is reduced or clipped some portion of time. Very often it clips the signal asymmetrically. For instance, high loads and/or low regenerative power limits will causes the negative speed peaks to be clipped, not the positive ones. However, this asymmetric clipping causes the mean position of the travelling block 20 to move upwards along the derrick 16 by a distance proportional to the amount of clipping. This motion is normally very undesirable. To overcome this problem the limiting module 133 has a clipping compensation function. It has been found that a simple but effective function is able to solve this problem. In particular, the following position error feed-back function is used to determine a corrective speed $v_p$ to be added to the input speed ($v_{set}$) of the limiting module 133:

$$v_p = \omega_{pf} \int (v_{set} + v_p - v_{out}) dt$$

where $\omega_{pf}$ is a small feed-back constant (typically 0.1 s$^{-1}$ or less), $v_{set}$ is the input set speed and $v_{out}$ is the clipped output value from the limitation module. As an example, if the downwards speed is clipped, the integrand and $v_p$ become negative, meaning that the net upwards motion due to clipping is stopped and stabilized. FIG. 12a shows a simulation example where the downwards acceleration is actively limited. This limitation causes the sinusoidal speed to be clipped, mostly on the negative side of the speed curve. If this clipping error is not compensated for, the travelling block 20 will start to move upwards as visualised by the dashed position curve in the lower graph. With a clipping compensation this motion is limited.

A major advantage of the limiting module 133 is that it does not turn off the active heave compensation as some prior systems do if one or more of the limitations are reached or exceeded. Heave compensation is often applied when the string is attached to a fixed point to the sea bed. It is therefore much better to temporarily skip the accuracy goals and obtain a partial compensation, than turning off the heave compensation completely.

Algorithms

Referring to Appendices B, C and D algorithms are shown for implementing the various corrections described above. The algorithms are designed to be implemented entirely in software and stored as a set of computer executable instructions in the memory 43 accessible by the PLC of the drawworks controller 38. In this way the PLC may act on the input signals from the MRUs 44 and from the operator to provide the final corrected velocity $v_{set}$ for the drive 54 that will achieve the desired travelling block velocity v. It is to be noted that the symbol "=" used in the formulae in Appendices B, C and D means assignment. When the same variable appears on both sides of an assignment, the right hand parameter represents the previous value while the left hand parameter represents the updated one.

Correction Module

At step BS1 the drawworks controller 38 reads, sets or calculates the list parameters and variables shown and holds them in memory. At step BS2 the speed correction term $v_G$ is determined using the heave signal from the MRU 44 and the result stored in memory. As explained above three MRUs are used to provide redundancy and to check for errors. Each raw signal from each MRU (acceleration, velocity and position) is sampled by the PLC every clock cycle (time Δt). The values are compared and are averaged if within an acceptable tolerance (typically ±0.05 m/s for the velocity signal). If one of the signals is outside the tolerance it is discarded and not used in the average calculation.

At step BS3 the corrections for the drive response are applied to the raw signals from the MRUs.

The raw acceleration signal $a_{mru}$ is passed through a low-pass filter with a time constant of $t_i$ i.e. the speed controller integration time constant. In order to obtain the high-pass filtered value of the acceleration signal as required by $v_H=t_m F_{hp}\{a_{mru}\}$ the low-pass filtered signal is subtracted from the raw acceleration signal representing movement of the drilling rig 10. The speed correction term $v_H$ is then calculated by multiplication with the motor time constant $t_m$ of the speed controller 39 and the result stored in memory.

At step BS4 the friction correction speed $v_F$, is determined using the formula described above. The friction acceleration is then determined:

$$a_f = \frac{F_f}{M}$$

where M is the total inertial mass in kilograms of the drive 54. The function $a_f$ therefore varies with measured travelling block speed v and measured hook load $F_{ext}$. If the drilling rig 10 is in motion as a result of sea swell, the acceleration function $a_f$ is an oscillatory function similar to a square wave.

The acceleration function value is passed through a low pass filter with a time constant $t_i$ i.e. the integration time constant of the PI controller. The filtered value is then subtracted from the original value to provide a high pass filtered value $a_{f,hp}$ which is used to determine the friction correction speed of $v_f$ $$v_f = t_m a_{f,hp}$$

and the result stored in memory.

At step BS5 the delay correction speed $v_{delay}$ is determined by filtering the raw acceleration value from the MRUs 44 with a low-pass filter with time constant of $t_{hp,delay}$ and the resulting value subtracted from the raw acceleration value to generate a high-pass filtered acceleration value $a_{hp}$. This value is then used to determine the delay correction speed $v_{delay}$ $$v_{delay} = t_{delay} a_{hp}$$

Having calculated all of the velocity corrections, the PLC is able to apply them to the average of the raw velocity signals $v_{mru}$ from the MRUs at step BS6. Firstly the AHC velocity $v_{ahc}$ is set in memory to the $v_{mru}$ value. The operator is able to select which of the various corrections for the MRUs, drive, friction and delay are applied (although usually all corrections are applied). Accordingly a check is made by the PLC before applying each velocity correction value calculated above. Assuming all are applied the new corrected velocity $v_{mruCorr}$ is calculated as $$v_{mruCorr} = v_{mru} + v_H + v_G + v_f + v_{delay}$$

and the result stored in memory. Optional position correction at step BS7 ensures that the integral of corrected heave compensation speed $v_{mruCorr}$ matches the mean value of the MRU position signal, as explained above.

Soft Switch Module

Referring to Appendix C the algorithm for the soft switch module is shown. At step CS1 the drawworks controller 38 reads, sets or calculates the list parameters and variables shown and holds them in memory.

At step CS2 the switch module 132 determines if active heave compensation (AHC) is on or off. There are four possibilities:
(1) AHC is on and is past the fade-in period;
(2) AHC is on and in the fade-in period;
(3) AHC is off and past the fade-out period; or
(4) AHC is off and in the fade-out period.

Whether or not AHC is on or off is determined by a signal from the operator. If AHC is on a direction parameter s is set s=1, whereas if AHC is off s is set s=−1. The direction parameter determines which of the four states above is current. A soft switch parameter x is set initially as x=0 and is subsequently determined as:

$$x = \frac{s\Delta t}{t_{fade}} + x$$

where $\Delta t$ is the PLC clock frequency (usually between about 20 ms and 50 ms) and $t_{fade}$ is the desired fade-in/out time (default is 10 s). Thus x either increases or decreases in increments of $\Delta t/t_{fade}$ depending on the value of s. The clipping function x=max(0, min(x,1)) means that if x goes below 0 it is reset to 0, whilst if it goes above 1 it is reset to 1.

The suggested trigonometric soft switch factor $S=(1-\cos \pi x)/2$ is then determined and its time derivative $S_{dot}$ is determined from numerical time differentiation of S.

The resulting active heave speed signal is then determined as:

$$v_{ahc} = s * v_{mruCorr} S_{dot} p_{mru}$$

The soft switch function is always applied to the velocity signal for the travelling block 20. One advantage of this is that full, partial (fade-in or fade-out) or zero active heave compensation is achieved simply by controlling the direction parameter s.

The algorithm above is repeated every clock cycle of the PLC (usually about every 20-50 ms) so that $v_{set}$ is substantially continuously adjusted while active heave compensation is on.

Limiting Module

Referring to Appendix D the algorithm for the limiting module 133 is shown. It will be recalled that this algorithm applies to downwards motion of the travelling block 20 only (remembering that downwards motion is defined as negative herein). At step DS1 the drawworks controller 38 reads, sets or calculates the parameters and variables shown and holds them in memory. The input parameters are determined as follows:

- $a_{ramp} = \Omega_{max} * r/t_{ramp}$ where $\Omega_{max}$ is maximum motor speed (in rad/s), r is the transmission radius (defined earlier) and $t_{ramp}$ is the ramp time, typically 2 s or longer.
- $F_{mMax} = n_m * T_{mMax}/r$ where $n_m$ is the number of active motors and $T_{mMax}$ is maximum torque per motor.
- $h_{min} = \max(h_{min0}, h-L_{stop})$ where $h_{min0}$ is an absolute minimum block position (typical 0.5 m) and $L_{stop}$ is a maximum stop length (typically 3 m).
- M and $M_{si}$ are either constants determined experimentally or they are calculated theoretically as explained earlier.
- $P_{min}$ and $P_{max}$ are either constants (matching the setup of the drives) or they are read externally from the vessel power management system.
- $v_{mMin} = -\Omega_{max} * r$.
- $\Delta v_{std}$ is set to a constant, typically 0.1 m/s or lower. Low values favour accuracy but increase computing time.
- $\Delta t$ is the cycle time of the PLC program, dependent on the total computing load of the PLC. Typical values are in the range of 0.01 to 0.1 s.
- $\omega_{clip}$ is a constant typically set to 0.1 s$^{-1}$.

At step DS2 three integration variables are initialised as shown: speed $v_{old}$, accumulated stop length $L_{acc}$ and speed increment $\Delta v$ (typically 0.1 ms$^{-1}$).

The purpose of steps DS3 and DS4 is to determine a minimum speed (i.e. maximum in a downwards sense) for the travelling block 20 at which the pull force available from the drawworks exceeds the force $F_{ext}$ exerted by the hook load. At step DS3 the minimum speed limit $v_{min}$ is set as $v_{old}-\Delta v$. At step DS4 the maximum motor pull $F_{max}$ is selected as the minimum of the motor pull force limit $F_{mMax}$ and the force available from the regenerative power limit $P_{min}$ and the current minimum speed limit $v_{min}$. If the net pull margin (defined as $F_{max}-F_{ext}$) is less than zero the speed increment is halved and the algorithm returns to step DS3. In this way minimum speed is gradually increased toward zero (i.e. downward velocity is reduced) until the net pull margin is greater than zero to ensure that there is some margin for stopping movement of the load. Only when the pull margin is greater than zero does the algorithm proceed to the next step.

At step DS5 the acceleration capacity of the motors is calculated and the maximum acceleration $a_{max}$ set to the minimum of the motor capacity and the acceleration limit $a_{ramp}$ imposed by the operator or set by the drive. At step DS6 the incremental change $\Delta L$ in the stop length caused by the change in $v_{min}$ is determined. The total stop length is then adjusted by adding $\Delta L$ to the stop length $L_{acc}$ and the new value compared to the distance between the travelling block 20 and a lower stop position. If the total stop length is not greater than this distance then the velocity $v_{old}$ is set to $v_{min}$ and the algorithm returns to step DS3 where $v_{min}$ is incremented by $\Delta v$ and the algorithm repeated until the total available stop length is reached; when this occurs the algorithm proceeds to the next step.

In this way the magnitude of $v_{min}$ is gradually increased until the available stop length is reached. At that point there are two values: a first value (e.g. $-1.4$ ms$^{-1}$ where the stop length is not reached and a second value (e.g. $-1.5$ ms$^{-1}$) where the available stop length has been exceeded. It is then necessary to interpolate between these two values to find the speed closest to the available stop length. This is performed in step DS7 where the $v_{min}$ is gradually increased from the first value until the available stop length is reached.

At step DS8 $v_{min}$ is selected as the maximum (i.e. closest to zero and therefore smallest magnitude) of the current value of $v_{min}$ and the rated velocity of the drive $v_{rated}$. At step DS9 the minimum (i.e. greatest magnitude) motor force is selected from the motor push force limit $F_{mMin}$ and the force available dependent on the motoring power limit $P_{max}$ and the current value of $v_{min}$. The net downwards push force $F_{min}$ is then determined from the selected value and the force exerted by the load $F_{ext}$.

A motor based acceleration limit $a_{motors}$ is then determined at step DS10 using $F_{min}$ and the total inertia mass M. A line slack acceleration limit $a_{slack}$ is determined in the next step using the force exerted by the hook load $F_{ext}$ and the inertial mass of the drill line and sheaves. The most restrictive value of these acceleration limits and $a_{ramp}$ is then selected and set as $a_{min}$ to ensure that none of these acceleration limits are exceeded.

At step DS11 a range for the set speed $v_{set}$ is then determined on the basis of the maximum and minimum acceleration capacities of the drive and the current value of $v_{min}$ The set speed $v_{set}$ is then adjusted for clipping (described in greater detail below). Finally the limited speed $v_{lim}$ that the drawworks 30 is instructed to use is selected by comparing the set speed firstly with the maximum allowable speed (determined from the maximum acceleration capacity), and selecting the lower value, and then comparing the result with the minimum allowable speed (determined from the minimum acceleration capacity) and selecting the maximum value. In this way the limited speed is set to $v_{set}$ if it falls within the allowable range, otherwise it is set to either the maximum or minimum allowable speed. In this way a safety limit is put on the operation of the drawworks 30 however controlled by the operator and/or active heave compensation.

Since the limiting module 133 may clip the operator set speed, which is a combination of the operator speed and the heave compensation speed, this will result in a position error of the travelling block 20. At step DS12 the position error is determined based on the difference between the set speed and the limited speed, and a clip correction velocity $v_{clip}$ is determined as a fraction of the position error. This clipped velocity is used in the next iteration of the algorithm at step DS11 to compensate the set speed. The set speed must still remain within the limits as described above however.

It is to be noted that each of the algorithms can be used independently of the others. For example, equipment may be provided that incorporates the functionality of any one of the algorithms.

Measurements

Figure 13:
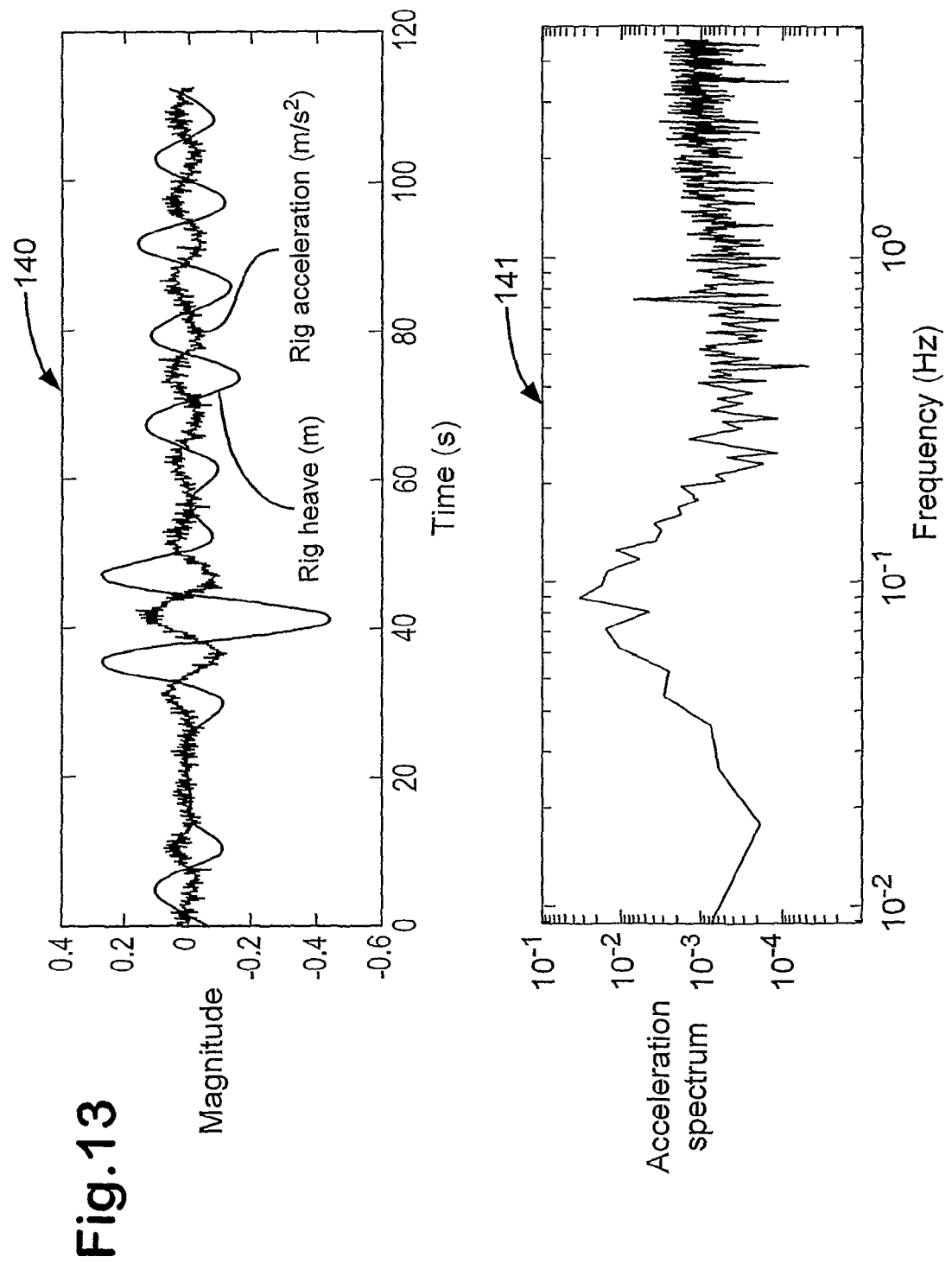
FIG. 13 is a set of graphs showing the magnitude of the rig heave and acceleration versus time, and the frequency spectrum of the acceleration of a drill ship.
Figure 14:
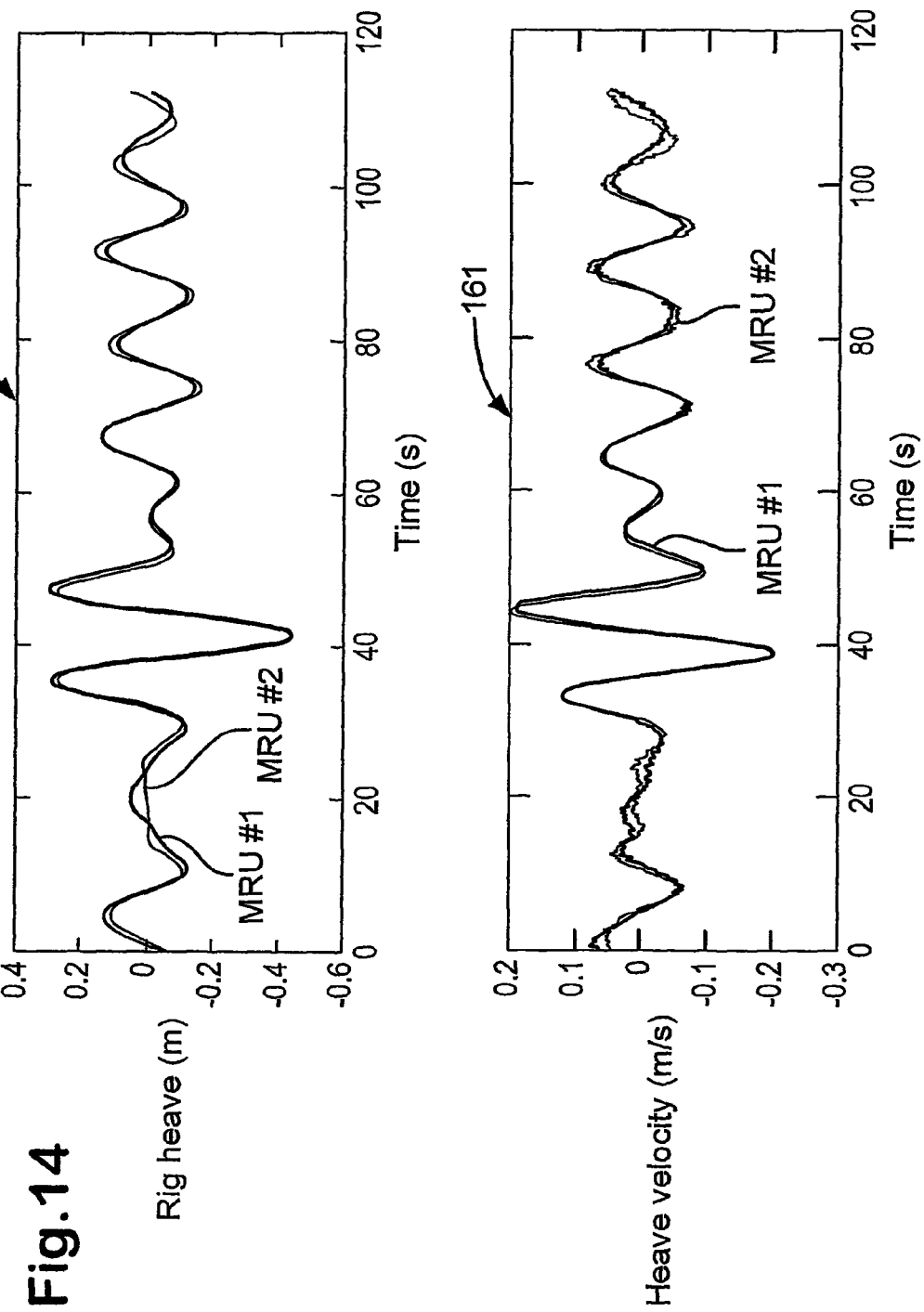
FIG. 14 is a set of graphs showing rig heave and rig velocity signals from two different measurement devices.

Referring to FIG. 13 a graph 140 shows rig heave and rig acceleration versus time, whereas another graph 141 shows the frequency spectrum of the acceleration signal in graph 140. The data was recorded on the drillship Deepwater Frontier on 10 Oct. 2001. The rig acceleration 142 and the rig heave 143 are the outputs PosMonD and AccMonD from an MRU-5, i.e. position and acceleration signals in the vertical axis respectively (positive acceleration upwards). It will be noted that the acceleration signal 142 has a frequency of about 0.1 Hz and that noise is superimposed on the trace. Furthermore it can be seen from graph 141 that noise in the acceleration signal is almost constant from about 1 Hz up to 4.5 Hz (which is the Nyquist frequency for these measurements). This indicates that the cut-off frequency in the MRU vibration filter is set too high. Furthermore the low frequency noise (<0.03 Hz) could be an aliasing effect from the sampling frequency of 9 Hz Referring to FIG. 14 a graph 160 shows how rig heave varies over a two minute period, and a graph 161 shows how heave velocity varies over the same time. The graphs 160 and 161 were generated using to MRU-5s (configured in the same way) and therefore each graph has two traces. It is clear from the two traces on each graph that the outputs from each MRU are not identical.

Simulation Results

A Simulink model was created to study the drawworks dynamics and the effects of the heave compensation corrections suggested above. The model has the following features:

The rig motion is modelled by a pure sinusoidal motion or by real recorded rig heave data.

The rig mobility, which describes how much the rig responds to hook load variations, is neglected in this model.

The MRU is modelled with the filters described above (when recorded MRU signals are used as inputs the simulations, inverse filters are applied for estimating the real rig motion).

The motor speed controller is a PI-controller with anti-windup. The small delay in the current (torque) controller is neglected. Different values for the gain P and the integration time constant $t_i$ are used.

The motor torque limit is speed dependent and closely follows the torque limits given by the motor manufacturer (General Electric).

The gear is assumed to be infinitely stiff so that motors and drum are regarded as one lumped inertia element. The transmission loss in the gear(s) is included in the model.

The effective drum inertia is dynamic and takes into account the variable length of line wrapped onto it.

The drum radius is also a variable function that varies stepwise (with a climbing transition angle of 0.5 rad).

The line and sheaves are modelled as a series of mass and springs where the inertia and elasticity of the line are variable functions of the distance between the blocks.

The sheave friction for each individual sheave is modelled by a speed dependent efficiency factor $$\eta_0 v / \sqrt{v^2 + v_0^2}$$

where $\eta_0 = 1 - 0.35 d_{line} / D_{sheave}$ and $v_o$ is a small transition speed.

The block is modelled as a lumped mass while the string can either be modelled as a lumped mass or as a transmission line (with a distributed series of mass and springs). In this study of heave compensation, the former and simpler option is selected.

Simulation results with and without error corrections are shown for various wave periods in FIGS. 15 to 24. All simulations, except the last two, are carried out without clipping feedback. The following data are used for the simulations MRU AC filter: General purpose, period=20 s, damping=0.7

MRU vibration filter: cut-off frequency=3 Hz, damping=0.7

Soft (slow) speed controller: Integration time=0.7 s, motor time constant=0.66 s Stiff (quick) speed controller: Integration time=0.5 s, motor time constant=0.15 s Drawworks linear damping=0

The configuration of the simulation is shown in Table 1 below.

TABLE 1

Figure 15:
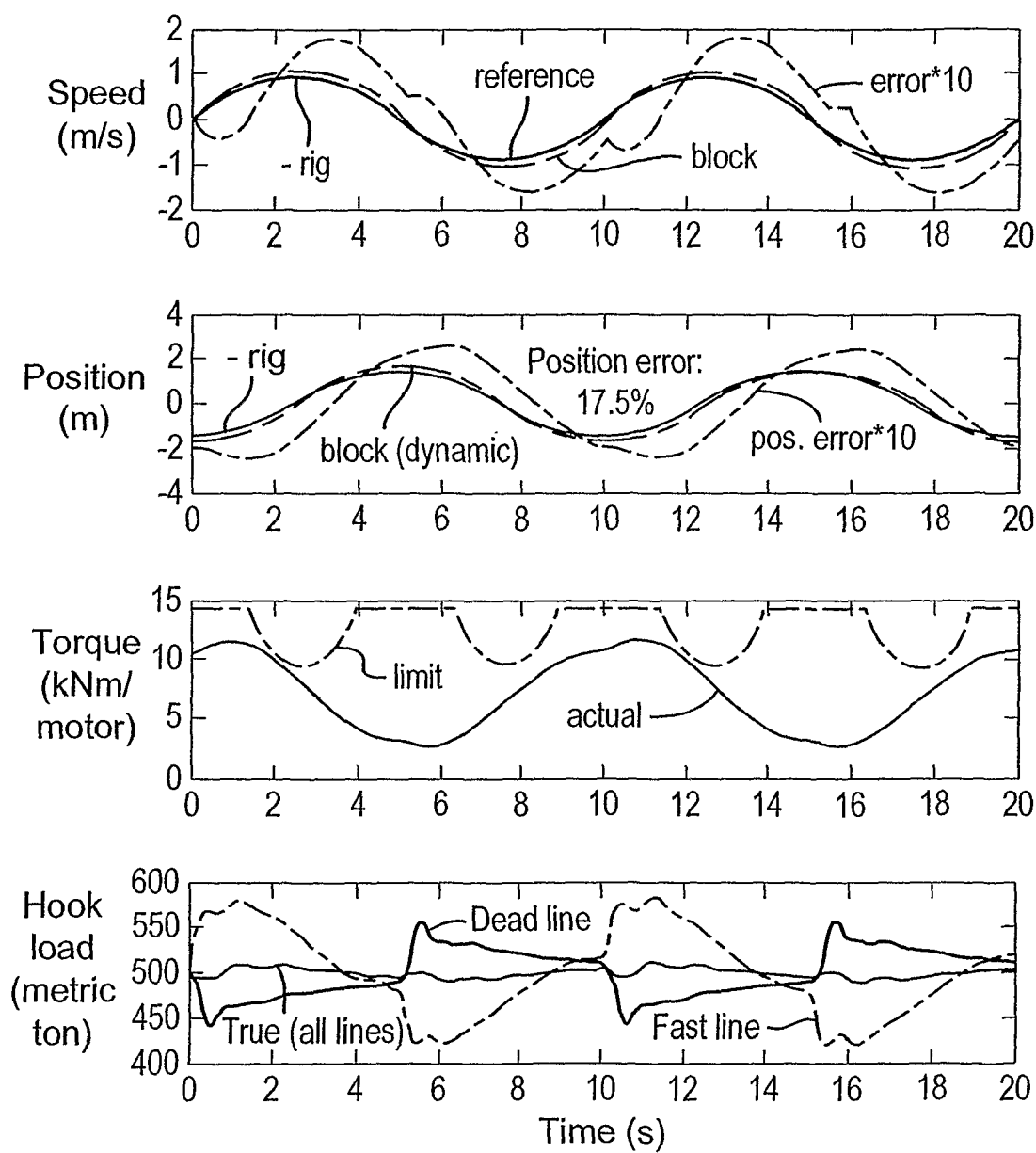
FIGS. 15 to 24 show simulation results of implementing different corrections according to the invention.
Figure 16:
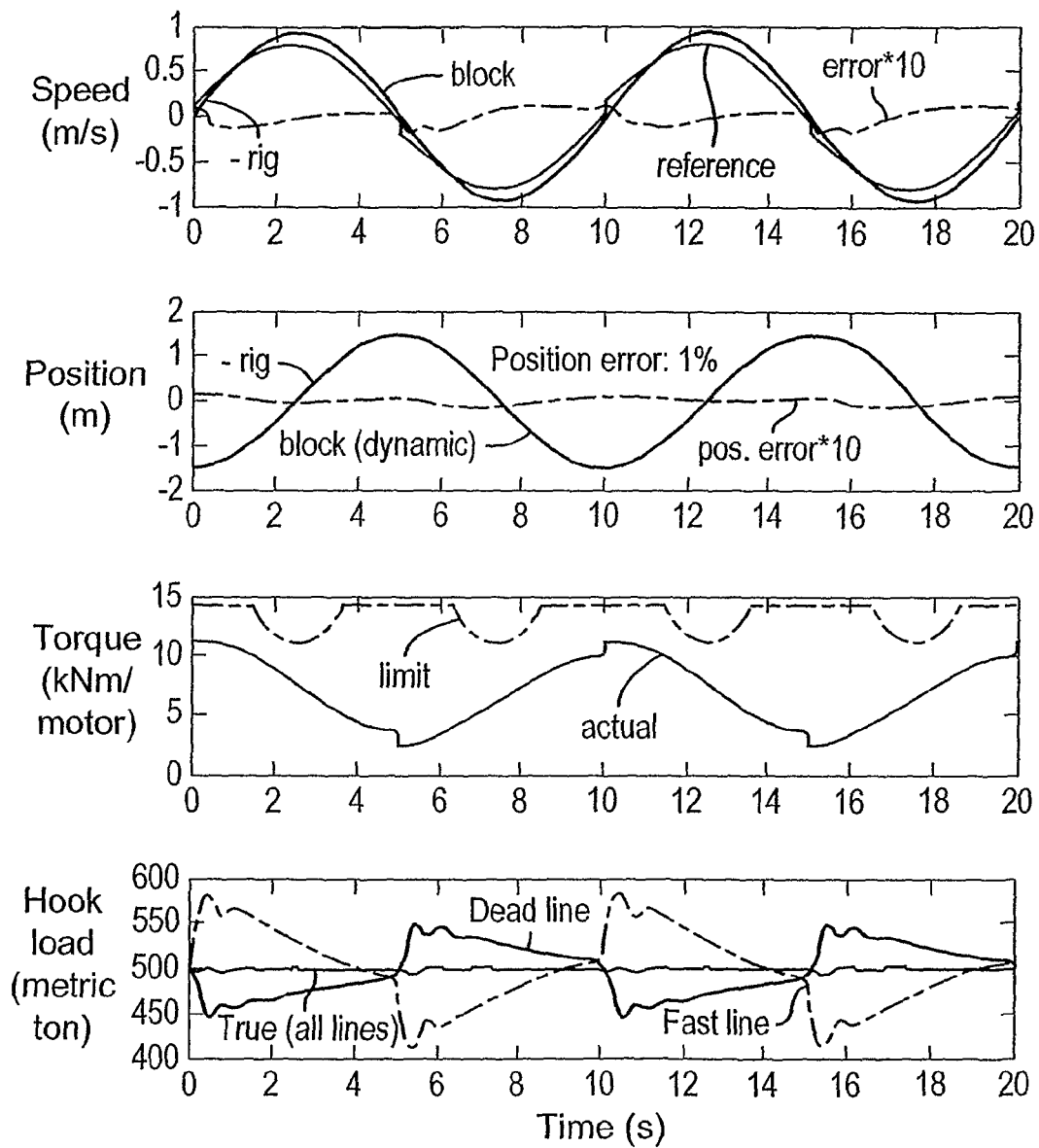
Figure 17:
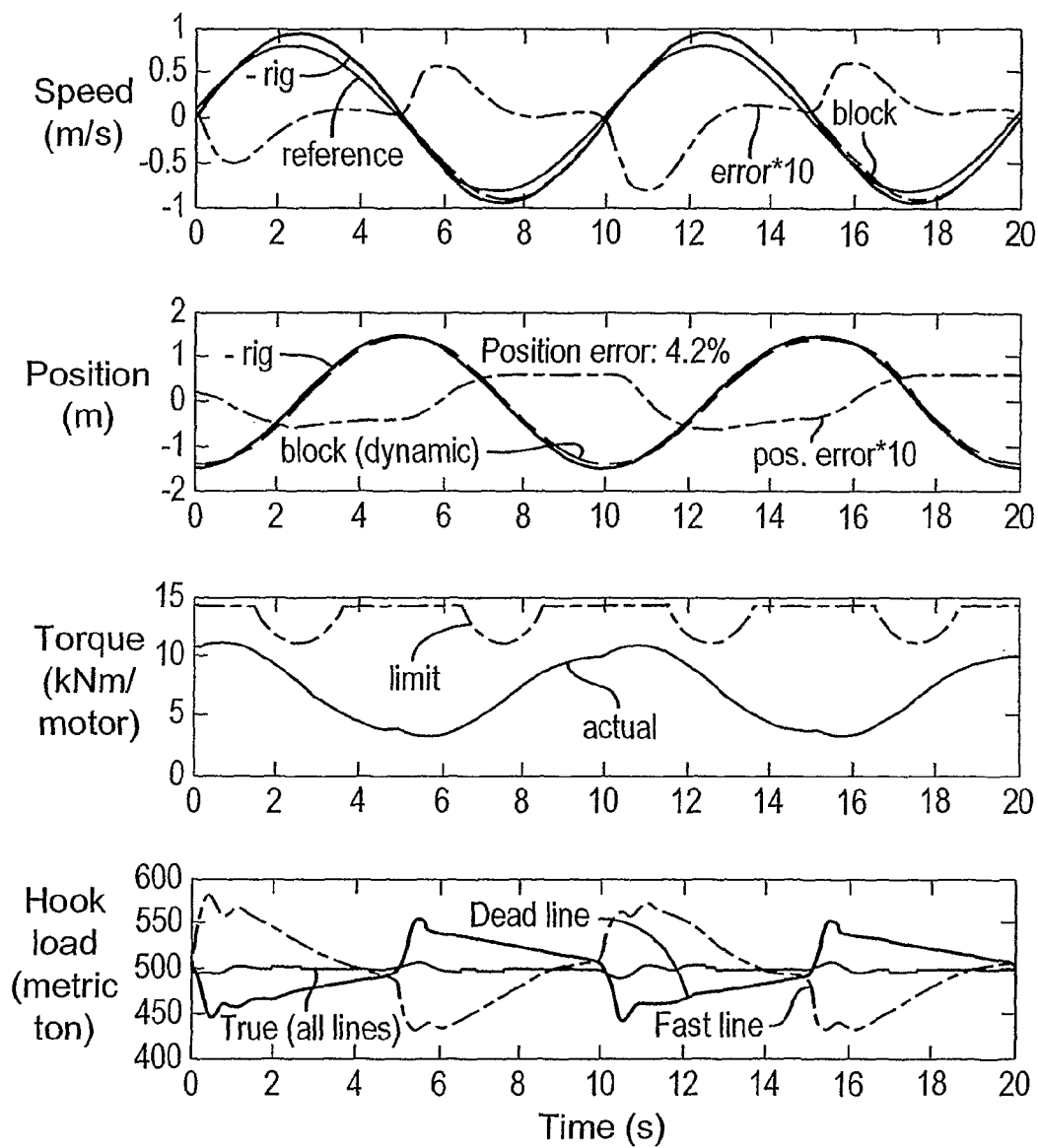
Figure 18:
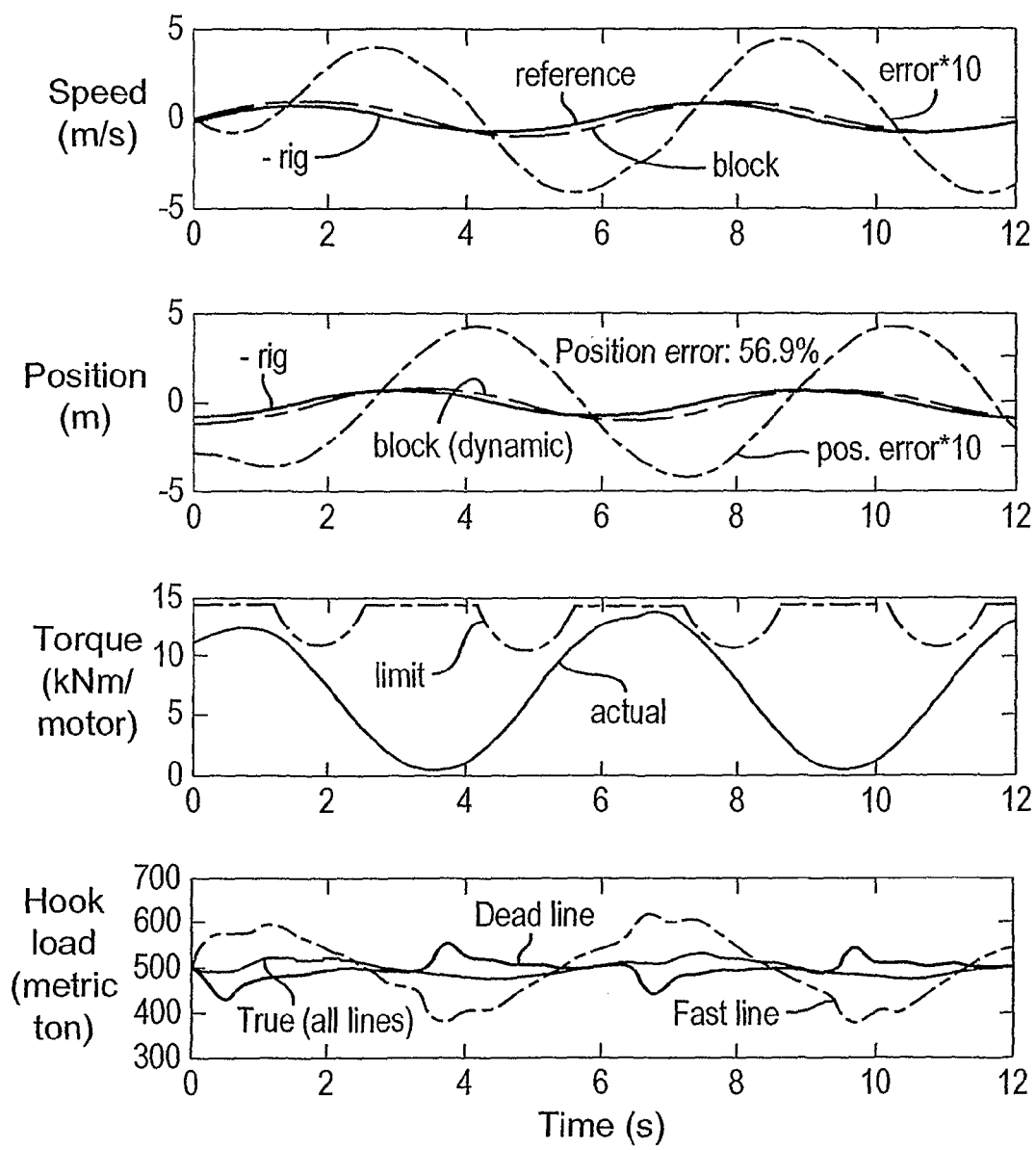
Figure 19:
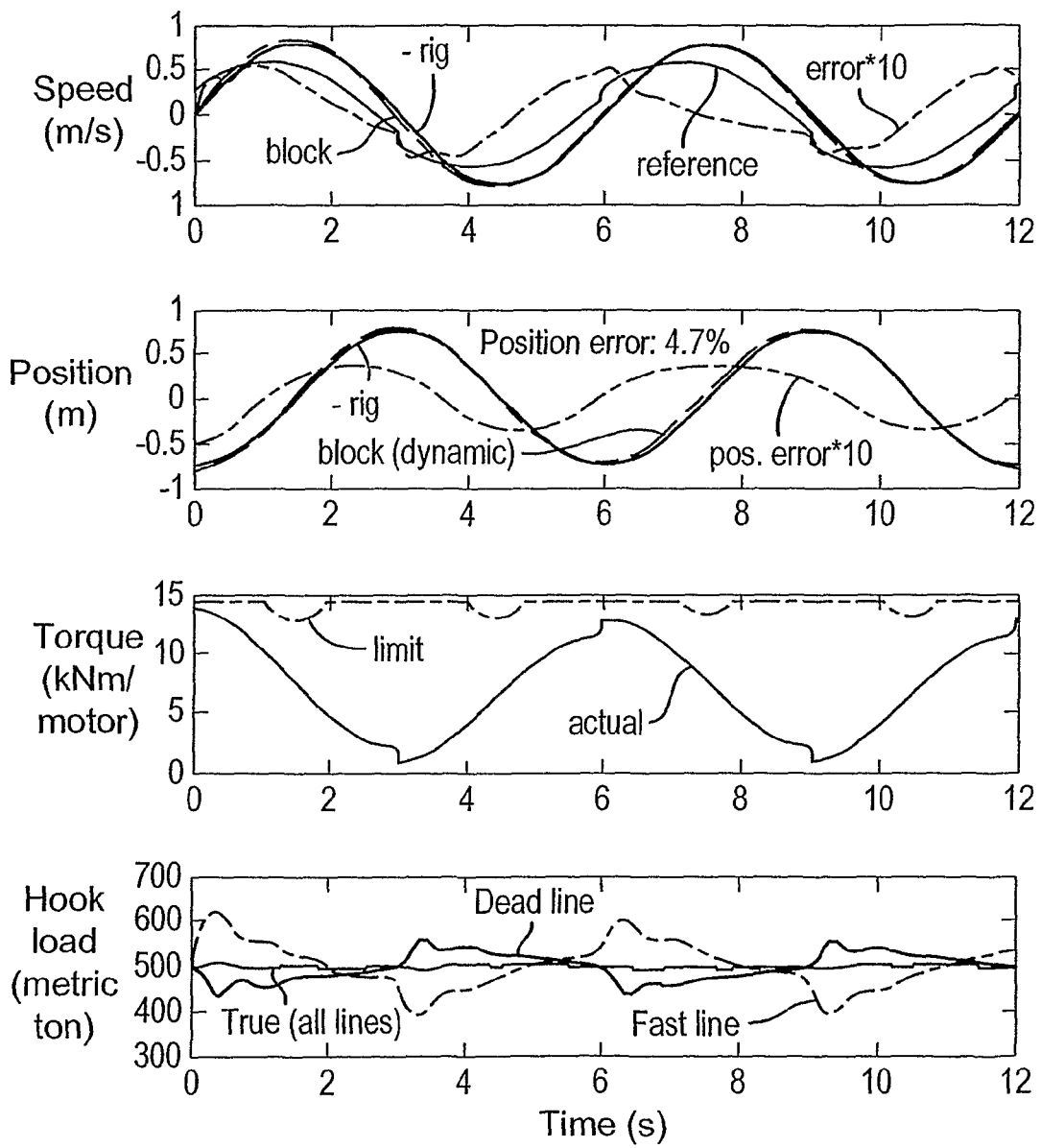
Figure 20:
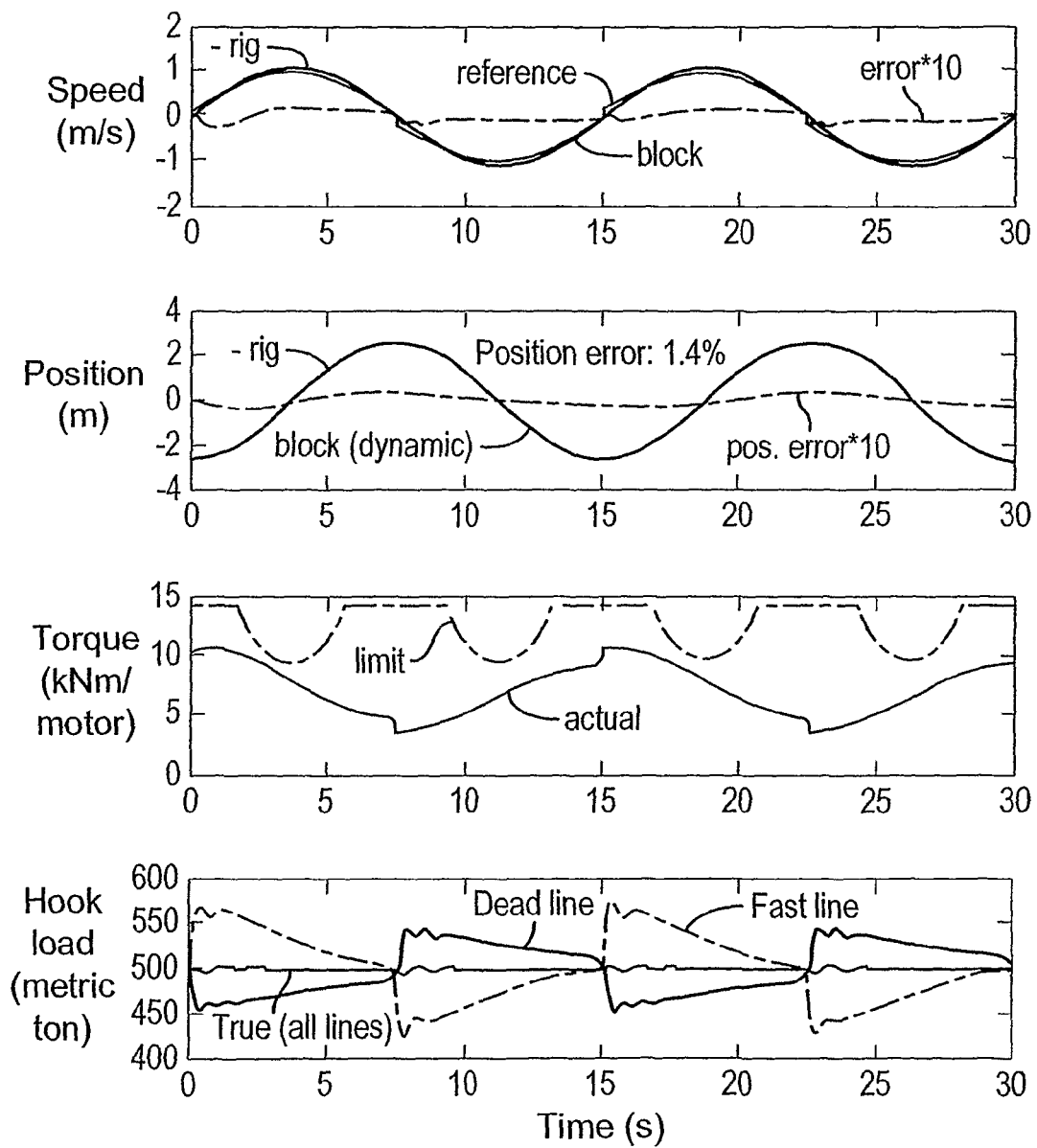
Figure 21:
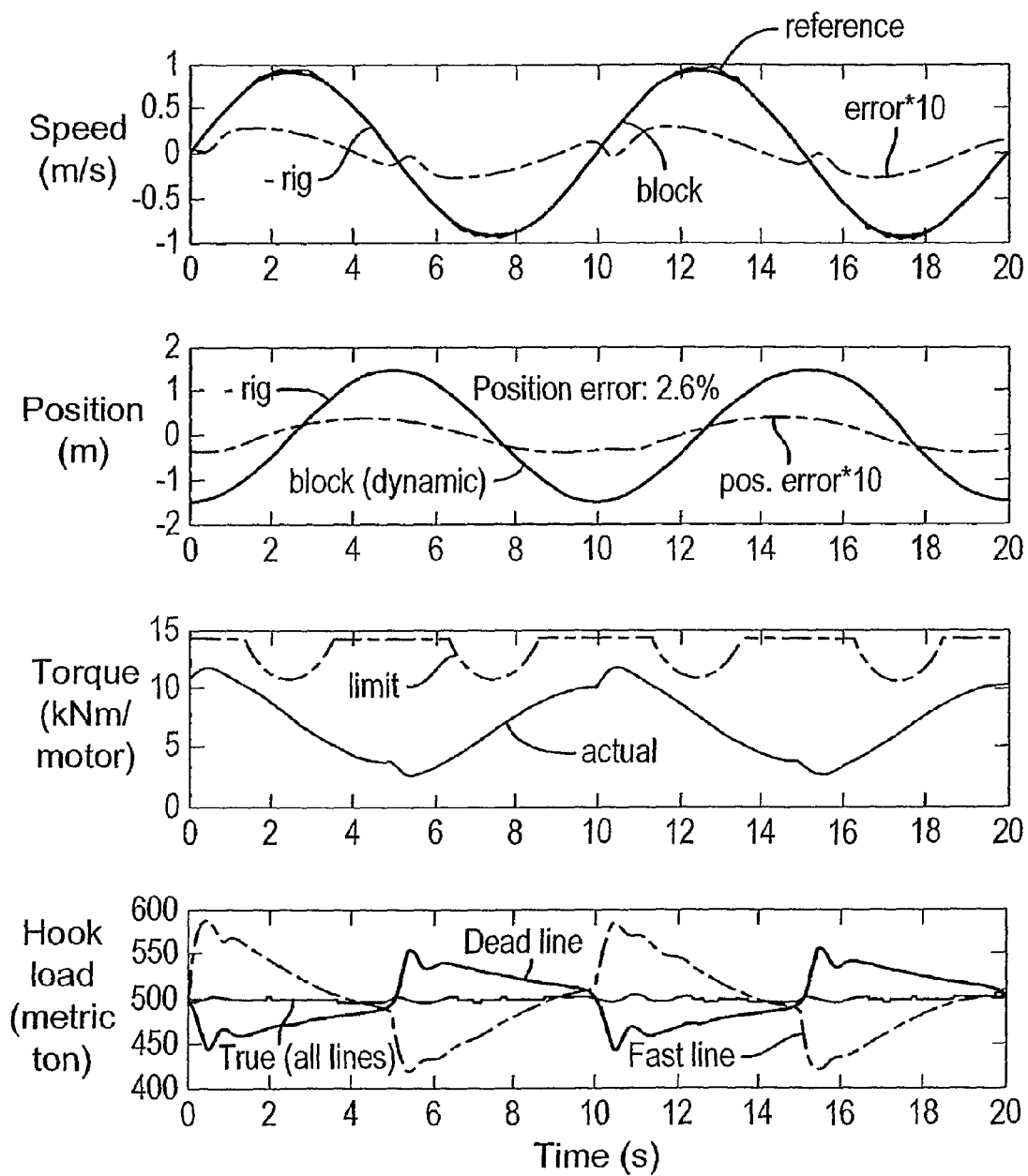
Figure 22:
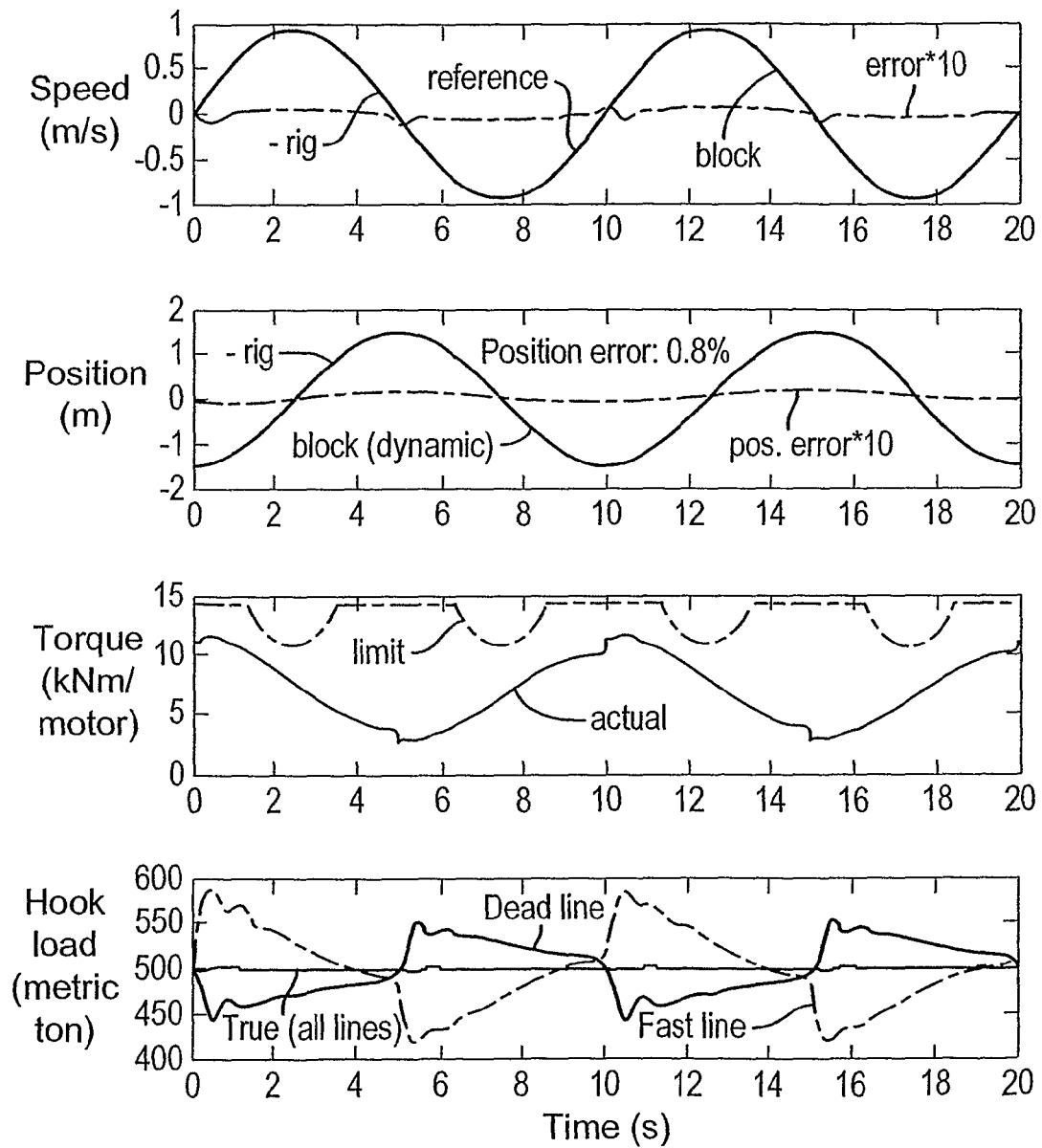
Figure 23:
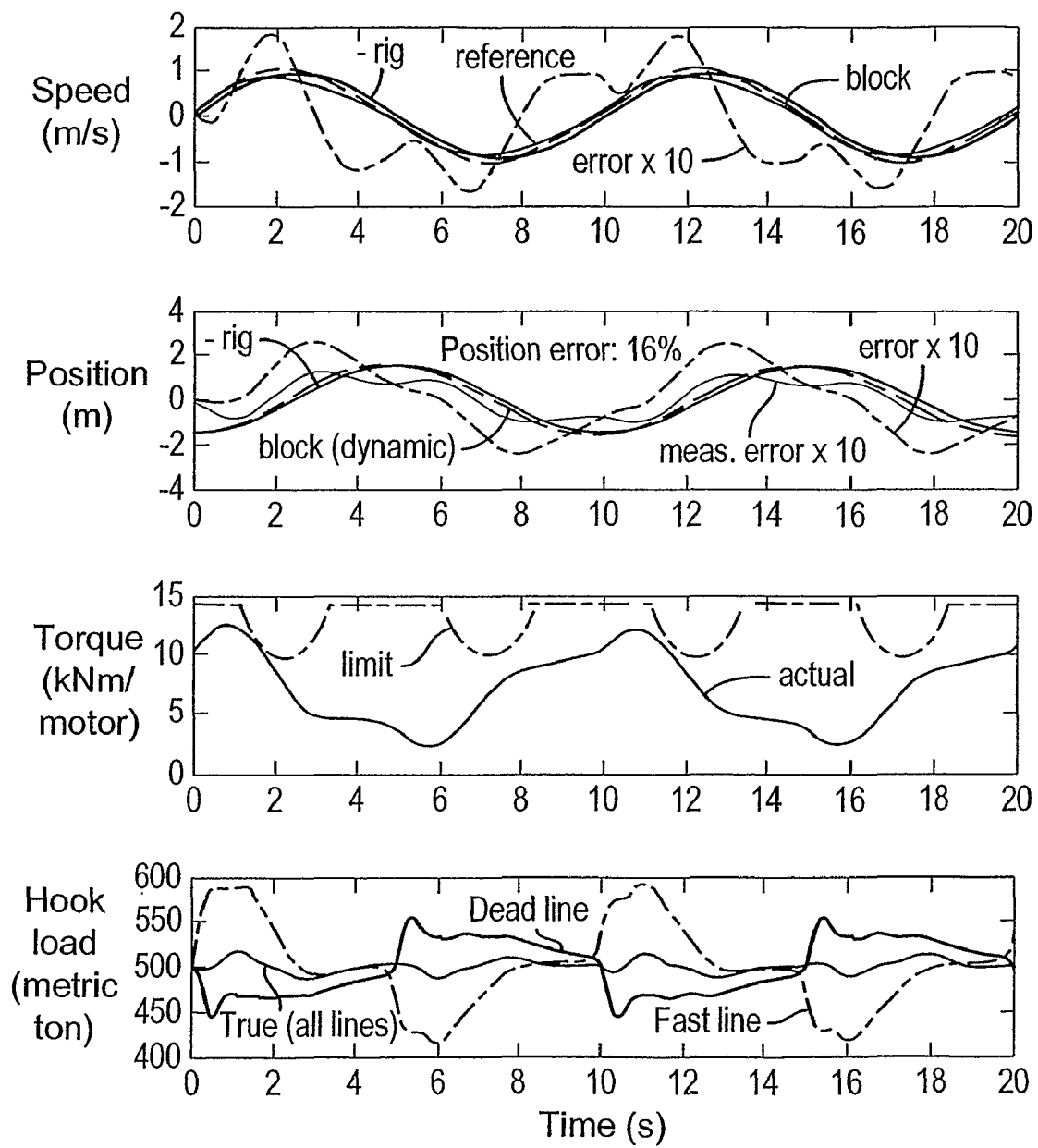

| Figure | Configuration |
|---|---|
| FIG. 15 | Simulation of active heave compensation (period = 10 s, amplitude = 1.5 m) with a slow speed controller and with no corrections |
| FIG. 16 | Simulation of active heave compensation (period = 10 s, amplitude = 1.5 m) with a slow speed controller and with corrections for MRU filters, drive response and friction |
| FIG. 17 | Simulation of active heave compensation (period = 10 s, amplitude = 1.5 m) with a slow speed controller and with corrections for MRU filters and drive response, but not for friction |
| FIG. 18 | Simulation of active heave compensation (period = 6 s, amplitude = 0.75 m) with a slow speed controller and no speed corrections. |
| FIG. 19 | Simulation of active heave compensation (period = 6 s, amplitude = 0.75 m) with a slow speed controller and with corrections for MRU filters and drive response |
| FIG. 20 | Simulation of active heave compensation (period = 15 s, amplitude = 2.6 m) with a slow speed controller and with corrections for MRU filters, drive response and friction. |
| FIG. 21 | Simulation of active heave compensation (period = 10 s, amplitude = 1.5 m) with a fast speed controller and with no corrections. |
| FIG. 22 | Simulation of active heave compensation (period = 10 s, amplitude = 1.5 m) with a fast speed controller and with corrections for MRU filters, drive response and friction |
| FIG. 23 | Simulation of active heave compensation (period = 10 s, amplitude = 1.5 m) with a slow speed controller, with position feedback only ($\omega_{clip} = 1.71/s$) |

TABLE 1-continued

Figure 24:
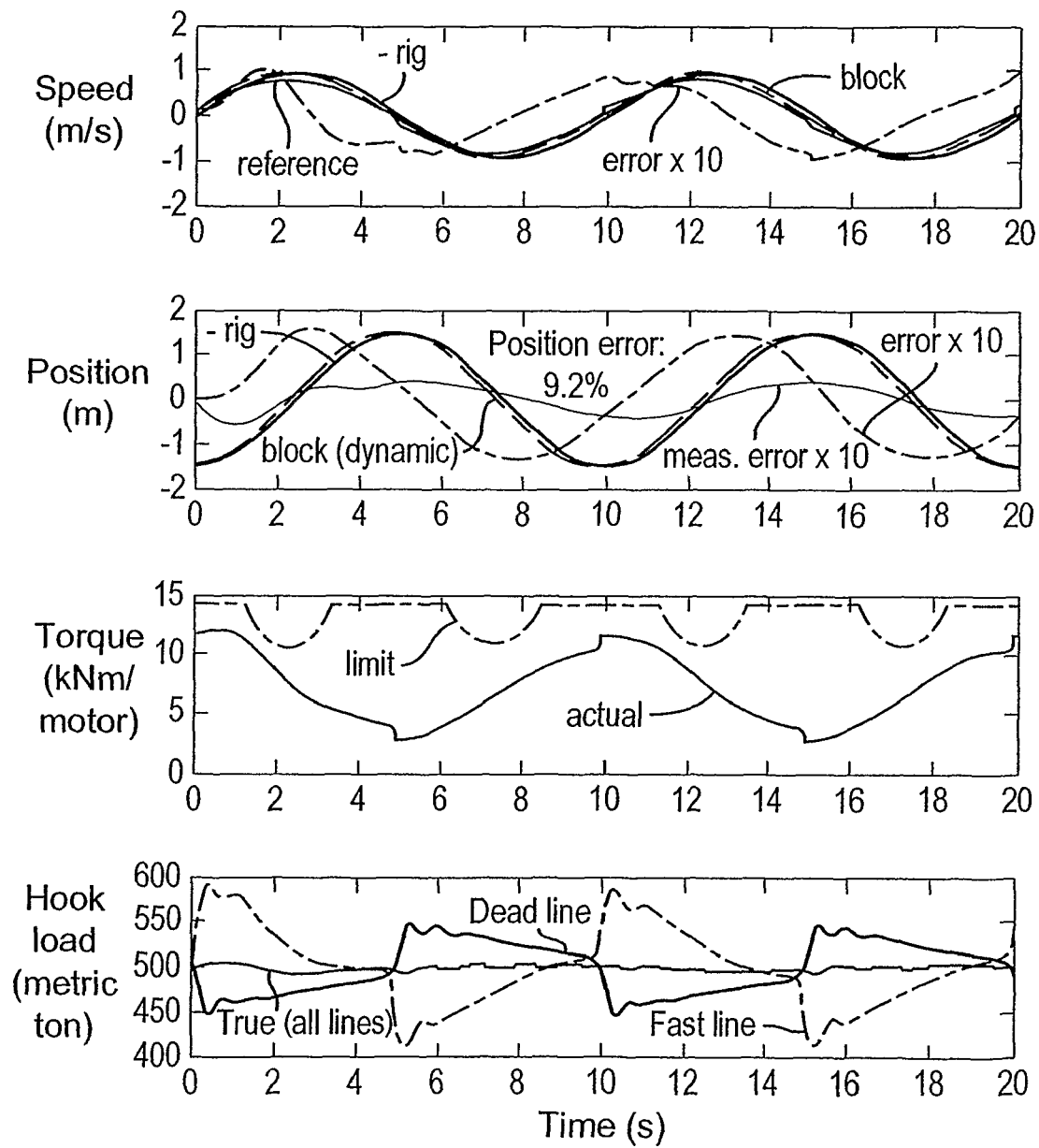

| Figure | Configuration |
|---|---|
| FIG. 24 | Simulation of active heave compensation (period = 10 s, amplitude = 1.5 m) with a slow speed controller, with corrections for MRU filters, drive response and frictions, and with position feedback ($\omega_{clip} = 1.71/s$) |

It is clear from these Figures that speed corrections to compensate for MRU filters, drive response and friction dramatically improves accuracy. This is especially true for the slow speed controller case where the compensation error is reduced by a factor of 10 or more.

The compensation error is smallest at a wave period corresponding to the center frequency of the MRU filters (at approximately 10 s) and it increases rapidly for shorter wave periods.

The friction compensation has a large effect on the reduction of the position error from 4.7% to 1% in 10 s period and 500 tons load. The effect of friction compensation increases proportionally with the load.

Stiffening of the speed controller (by reducing motor and integration time constants) improves the compensation accuracy significantly, especially when speed corrections for MRU, drive and friction compensation are not applied.

Dual Drawworks

Figure 25:
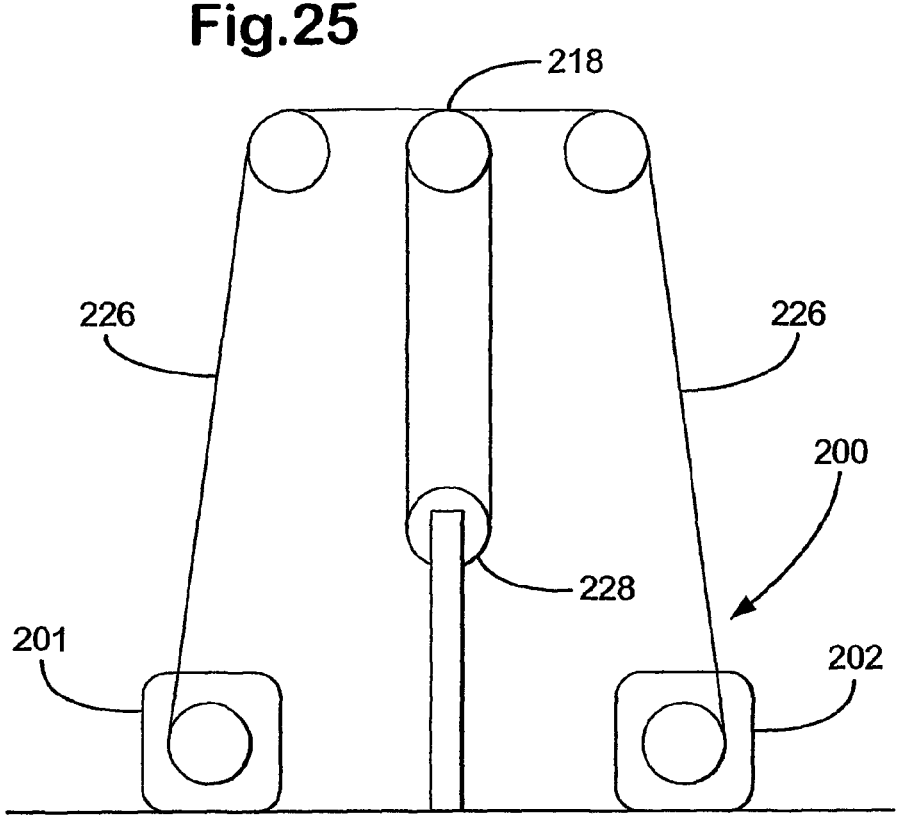
FIG. 25 is a schematic side view of an apparatus employing a second embodiment of a method according to the invention.

Referring to FIG. 25 an apparatus for implementing a second embodiment of the method according to the invention is generally identified by reference numeral 200. The apparatus 200 is generally similar to the first embodiment except that the dead line and anchor 28 have been replaced by a drawworks similar to the drawworks 30. The apparatus therefore has two drawworks 201, 202 (known as 'dual drawworks'), one on either side of the derrick (not shown in FIG. 25); although it is possible to stack the drawworks on top of one another on one side of the derrick. Each drawworks 201, 202 has its own power supply. Each end of the steel rope 226 (or drill line) is attached to a respective one of the drawworks and the intermediate cable passes through the crown block 218 and travelling block 220. In this way the travelling block 220 can be raised and lowered by reeling cable 228 on and off either one of the drawworks 201, 202, (so-called 'single mode') or both drawworks simultaneously (so-called 'dual mode'). The dual mode can either be run at the same speed (synchronous mode), or run at different speeds (asynchronous mode).

In synchronous mode the drawworks 201, 202 are each run with the same speed and the centre sheave of the crown block 218 is non-rotating. Whilst the line speed magnitude increases towards the ends spooled in or out of the drum, the relatively low line speed in the synchronous mode has many advantages, such as 1) lower inertia of the line and sheave system, 2) higher acceleration limits for line slack and 3) less wear and bending induced fatigue load of the cable 226. There are also some advantages if the speed ratio of the drawworks is changed from the synchronous 50/50 ratio to 40/60 or 60/40 ratio, for example. This will distribute the line wear more evenly along line and thereby extend the line life as compared with a constant 50/50 ratio.

One of the major benefits of employing dual drawworks is redundancy. If one unit fails, the other can still be operated and move the travelling block 220, like a conventional single drawworks. This is especially important in critical operations when heave compensating while the string is fixed to bottom for example. If the heave compensation stops, the tension forces from the heaving vessel could damage the string and even cause blowouts or other hazard situations. With one dual drawworks unit intact, the compensation can continue. Even though the speed and heave compensation capabilities in the single mode are reduced to roughly 50% of the dual mode, it offers full redundancy unless the weather conditions are extremely rough and the vessel heave exceed the single mode capacity limits In order to minimise the transient errors when the failed unit stops, the remaining unit should take into account the motion of the failed unit during the short but finite stopping time.

Referring to Appendix E an algorithm is shown for splitting the travelling block set speed $v_{set}$ into to two components, one for each drawworks 201, 202. This speed splitting software can be implemented in one single PLC (e.g. a drawworks controller like the drawworks controller 38) to control both drawworks 201, 202.

At step ES1 the PLC sets or calculates the parameters and variables shown and holds them in memory. The speed factor $s_1$ is set by the operator between 0 and 1. Typically $s_1$ is set at 0.5 resulting in a 50/50 split of the speed command received from the limiting module 133. The optimal values for time delay $t_d$, the position control parameter $f_p$ and the feed-back constant $\omega_p$ must be determined by trial and error during commissioning. The motion components, acceleration, speed and position for each unit are basically determined from motor encoders in the same way as they are for conventional single drawworks. However, instead of one transmission radius discussed earlier for a conventional single drawworks) there are now two radii, one for each drawworks. They differ from each other when the drums have different number of layers.

At step ES2 the controller checks to see if one or other of the drawworks is disabled (for whatever reason). If so, the algorithm jumps to step ES5. Otherwise at step ES3 the speed split is between the two drawworks 201, 202 using the speed factor $s_1$.

As the drawworks 201, 202 do not work perfectly there will be an error between the actual position of the travelling block 220 and the position that it should be in according to the speed commands. Step ES4 is intended to compensate for this error. Firstly, the actual total block height is obtained from angular position encoders on each drawworks. Firstly, the actual total block height h is obtained from the position values for each drawworks 201, 202. The height error $h_{err}$ is then determined by comparing the actual block height component $h_1$ with the proportion of the total block height h according to the speed factor $s_1$. To correct for this error, which is normally small but can become large when the speed factor is changed, a corrective balancing speed $v_{bal}$ is calculated. It is first set proportionally with the position error by multiplying the position error by a feedback constant $\Omega_p$, but to avoid motion when there is no set speed for the travelling block, the feedback speed is clipped to limits defined by $\pm f_p |v_{set}|$. The resulting balancing speed is then subtracted from and added to the set speeds for drawworks 201 and 202, respectively. In this way the position balancing speed will cause a cross spooling of the drill line between the two units but no net motion of the travelling block 220.

Step ES5 is calculated only if one of the units is disabled, typically as a consequence of a failure. Disabling of a unit can occur abruptly when the unit is in full motion. In such cases operator set speed factor is overridden and the remaining unit provides all of the set speed. However, even when the disabled unit stops by means of its emergency brakes, it will not stop instantly. To make the transition from dual mode to single mode as smooth as possible, the transient, measured speed of the disabled drawworks is subtracted from the set speed of the remaining active unit. The time delay correction based on the acceleration of the disabled unit is added for minimising the compensation errors during the transition time interval. When the disabled unit has come to a complete stop, these terms automatically reduce to zero and have no effect.

Figure 26:
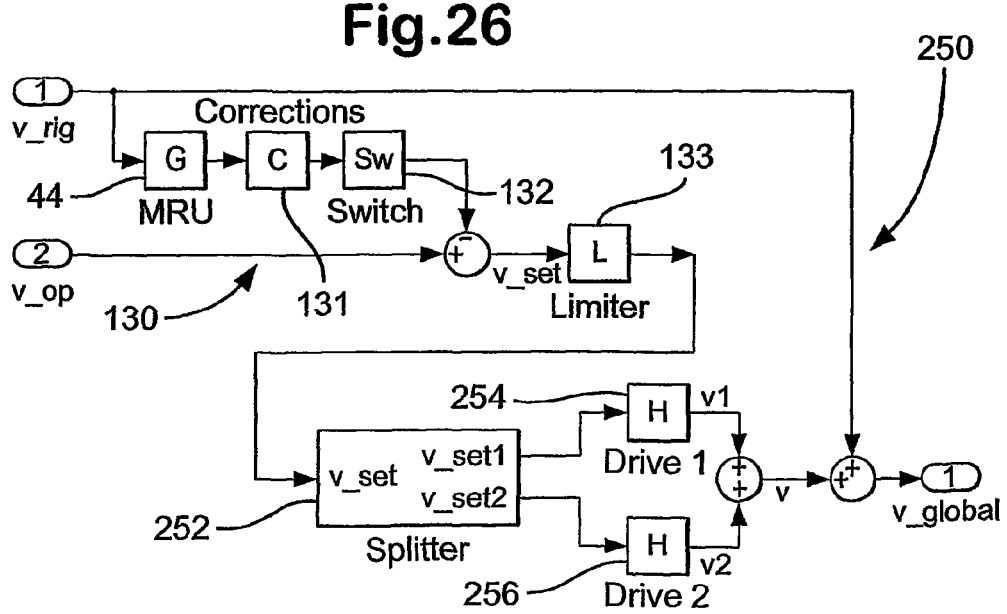
FIG. 26 is a schematic control diagram for controlling the apparatus of FIG. 26 in accordance with the second embodiment.

Referring to FIG. 26 a control diagram 250 is generally similar to the control diagram 130 with like reference numerals indicating like parts. Following the limiting module 133 the adjusted heave compensation signal is passed to a splitter module 252. The splitter module 252 comprises computer executable instructions stored in the memory of the drawworks controller 38 and is functions to determine the set speed of each drawworks 201, 202 (including any position correction). Each set speed is sent to a respective drive 254, 256 of the drawworks 201, 202 which controls the speed accordingly. The output speeds of the two drawworks are summed to control the velocity of the travelling block 220. The motion of the drilling rig is superimposed on this output speed; assuming accurate heave compensation the final movement $v_{global}$ of the travelling block 220 will be substantially equal to the input by the operator $v_{op}$.

Advantages of this algorithm include:

a) synchronous as well asynchronous motion of two drawworks; the speed ratio selectable by the operator.

b) position balancing ensures that the position component from each unit approaches the specified speed ratio. The position balancing function is a cross spooling that does not affect the position of the travelling block. The balance correction speed is limited to a fraction of the set speed and is therefore frozen when the travelling block is stopped.

c) if one unit fails and stops, the other unit takes over the entire heave compensation task. This unit also compensates for the transient motion of the failed unit, in order to make the transition from dual to single mode as smooth as possible.

One alternative is for an MRU to store computer executable instructions for making any number of the speed corrections (MRU, drive, friction and/or delay) internally. Another alternative is for the functionality provided by the invention to be provided in a separate PLC (i.e. not part of a drawworks controller).

Although the invention brings about particular benefits in the field of oil and gas extraction at sea (e.g. drilling operations, well service operations including coil tubing, wireline operations, etc.), the use of the invention is not limited to this field. Other fields of use are envisaged such as any hoisting equipment (e.g. cranes and winches) for use on vessels where the effects of heave need to be reduced, for example pipe and cable laying vessels.

Although the embodiments of the invention described with reference to the drawings comprises computer apparatus and methods performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the methods according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal that may be conveyed via electrical or optical cable or by radio or other means.

When the program is embodied in a signal that may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant methods.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes.

The invention claimed is:

1. A method of actively compensating heave of a vessel to which a load is attached, there being a connection device connecting said load to said vessel, which method comprises the steps of:
   (a) measuring with a measurement device the heave of said vessel and outputting a heave signal representative thereof, which heave signal comprises a velocity signal representing velocity of said vessel in response to said heave;
   (b) using said heave signal to compensate for said heave by moving said connection device relative to said vessel as a function of said heave signal, whereby movement of said load due to said heave is reduced;
   said heave signal comprising errors induced by said measurement device whereby accuracy of said compensation is reduced, characterised by the steps of:
   (c) processing said heave signal by determining a velocity correction (vG) and adjusting said velocity signal by said velocity correction so as to reduce said errors and outputting an adjusted heave signal; and
   (d) using said adjusted heave signal to move said connection device to compensate for said heave.

2. A method according to claim 1, wherein said step (c) comprises reducing a lead phase error in said velocity signal by adding said velocity correction (vG) to said velocity signal, which velocity correction is proportional to a position signal representing the position of said vessel relative to a fixed point.

3. A method according to claim 1, wherein said vessel comprises drive apparatus for effecting movement of said connection device as a function of said heave signal, the method further comprising the step of further adjusting said heave signal to reduce errors introduced by inertia and/or friction effects of said drive apparatus in effecting movement of said connection device.

4. A method according to claim 3, wherein said further adjustment is proportional to (a) a drive time constant being the quotient of a moment of inertia (J) of said drive apparatus divided by a gain (P) of a proportional integral (PI) speed controller of an electronic control system of a drive of said drive apparatus, and (b) an acceleration signal representing a filtered value of the acceleration of said vessel in response to said heave, whereby said heave signal is adjusted to compensate inertia errors introduced by said drive apparatus.

5. A method according to claim 4, wherein said acceleration signal has been filtered by an acceleration filter that comprises a first order high pass filter having a time constant substantially equal to an integration time constant (ti) of said proportional integral (PI) speed controller.

6. A method according to claim 4, wherein said further adjustment is proportional to (a) said drive time constant, and (b) an acceleration signal representing a filtered value of the friction acceleration being the quotient of a friction force (Ff) experienced by said drive apparatus divided by a total inertial mass (M) of said drive apparatus, whereby said heave signal is adjusted to compensate friction errors introduced by said drive apparatus.

7. A method according to claim 6, wherein said acceleration signal has been filtered by an acceleration filter that comprises a first order high pass filter having a time constant substantially equal to an integration time constant (ti) of said proportional integral (PI) speed controller.

8. A method according to claim 1, further comprising the step of applying dynamic limits to the magnitude of said heave compensation, wherein said limits are set as a function of the acceleration capabilities of a drive apparatus or said connection device.

9. A method according to claim 8, further comprising the step of determining a maximum and minimum allowable acceleration of said connection device, defining said dynamic limits as an upper limit and a lower limit on the basis thereof, and limiting movement of said connection device based on said upper and lower limits.

10. A method according to claim 1, further comprising the step of determining a maximum and minimum speed limit from the present position of said connection device such that said load can be stopped within a constant or dynamic position limit.

11. A method according to claim 1, wherein application of said dynamic limits causes asymmetric clipping of said adjusted heave signal whereby a mean position of said connection device moves with time, the method further comprising the step of compensating said adjusted heave signal for said asymmetric clipping to reduce movement of said mean position.

12. A method according to claim 11, wherein said compensation step comprises feeding back said adjusted heave signal following clipping, determining a clipping compensation signal and adding said clipping compensation signal to said adjusted heave signal.

13. A method according to claim 1, wherein there are two drawworks for controlling the position of said connection device, said two drawworks having a cable therebetween that passes through said connection device, the method further comprising the steps of splitting said adjusted heave compensation signal between said two drawworks so that each applies a fraction thereof to control the position of said connection device.

14. A method according to claim 13, further comprising the step of splitting said adjusted heave compensation signal substantially evenly between said two drawworks.

15. A method according to claim 13, further comprising the step of splitting said adjusted heave compensation signal substantially unevenly between said two drawworks, whereby the portion of said cable passing through said connection device and subject to bending stresses may be changed.

16. A method according to claim 13, further comprising the step of instructing one of said two drawworks to provide all of said heave compensation when the other of said two drawworks is disabled.

17. A method as claimed in claim 1, wherein said vessel is a floating drilling rig, said connection device comprises a travelling block, and step (b) comprises moving said travelling block with a drawworks to compensate for said heave.

18. An apparatus for controlling active heave compensation, the arrangement being such that, in use, said apparatus controls movement of a connection device that connects a load to a vessel, which apparatus comprises an input for receiving a heave signal from a measurement device, which heave signal is representative of the heave of said vessel, which heave signal comprises a velocity signal representing velocity of said vessel in response to said heave;

which apparatus further comprises a memory storing computer executable instructions for performing the steps of:

(a) using said heave signal to compensate for said heave by moving said connection device relative to said vessel as a function of said heave signal, whereby movement of said load due to said heave is reduced;

said heave signal comprising errors induced by said measurement device whereby accuracy of said compensation is reduced;

(b) processing said heave signal by determining a velocity correction (vG) and adjusting said velocity signal by said velocity correction so as to reduce said errors and outputting an adjusted heave signal; and (c) using said adjusted heave signal to move said connection device to compensate for said heave.

19. A measurement device for measuring heave of a vessel, which measurement device comprises one or more sensor for measuring motion of a vessel, a memory storing computer executable instructions for performing the steps of:

(a) measuring with said one or more sensor the heave of a vessel, and generating a heave signal which comprises a velocity signal representing velocity of said vessel in response to said heave, said heave signal comprising errors induced by said measurement device; and (b) processing said heave signal by determining a velocity correction (vG) and adjusting said velocity signal by said velocity correction so as to reduce said errors and outputting an adjusted heave signal.

\* \* \* \* \*